United States Patent [19]

Badinger

[11] Patent Number: 5,097,423

[45] Date of Patent: Mar. 17, 1992

[54] APPARATUS AND METHOD FOR USE IN INSPECTING A JOINT

[75] Inventor: Michael A. Badinger, New Orleans, La.

[73] Assignee: Martin Marietta Corporation, Bethseda, Md.

[21] Appl. No.: 260,319

[22] Filed: Oct. 20, 1988

[51] Int. Cl.$^5$ .................. G01H 13/00; G01B 3/22
[52] U.S. Cl. .................. 364/507; 73/582; 33/833; 33/556
[58] Field of Search .................. 364/506–508, 364/550; 73/577, 582, 588, 661, 663, 666; 340/686, 687; 33/832, 833, 501.06, 501.08, 501.09, 546, 556, 551, 552, 555

[56] References Cited

U.S. PATENT DOCUMENTS

| | | | |
|---|---|---|---|
| 4,144,766 | 3/1979 | Wehrmeister | 73/587 |
| 4,171,645 | 10/1979 | Miserentino et al. | 73/661 |
| 4,368,522 | 1/1983 | Spath et al. | 364/550 |
| 4,494,410 | 1/1985 | Van Bochove et al. | 73/588 |
| 4,506,549 | 3/1985 | Thome | 73/582 |
| 4,542,639 | 9/1985 | Cawley et al. | 73/582 |
| 4,586,142 | 4/1986 | Cota et al. | 364/507 |
| 4,604,706 | 8/1986 | Fisher, Jr. et al. | 364/507 |
| 4,641,527 | 2/1987 | Hiroi et al. | 73/582 |
| 4,755,952 | 7/1988 | Johns | 364/507 |
| 4,763,528 | 8/1988 | Bouami et al. | 73/577 |

Primary Examiner—Joseph L. Dixon
Attorney, Agent, or Firm—Tarolli, Sundheim & Covell

[57] ABSTRACT

A hand-held probe assembly has two fixed probe legs and two movable probe legs disposed in a linear array. A pair of probe legs, one of which is fixed and one of which is movable, is engageable with a first plate edge portion. A second pair of fixed and movable probe legs is engageable with a second plate edge portion. Retractable alignment legs engage a joint between the plate edge portions to aid in positioning the probe assembly relative to the plate edge portions. In an alternative embodiment of the invention, an alignment leg engages opposite sides of a joint between the plate edge portions to hold the probe assembly centered relative to the joint. The probe assembly generates electrical signals corresponding to the extent of movement of the movable probe legs. Using these electrical signals, a microcomputer calculates the peak angle and the mismatch at the joint between the plate edge portions. If the calculated values of the peak angle and the mismatch are within predetermined limit values stored in a memory, then the geometry of the joint conforms to specification requirements.

39 Claims, 11 Drawing Sheets

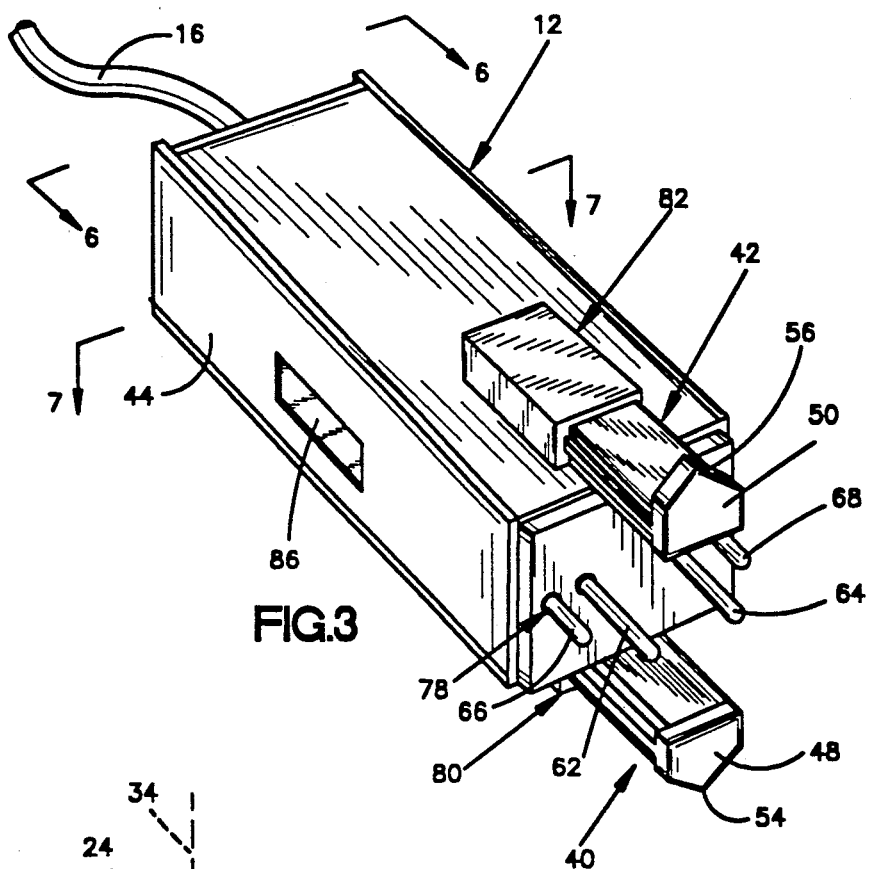
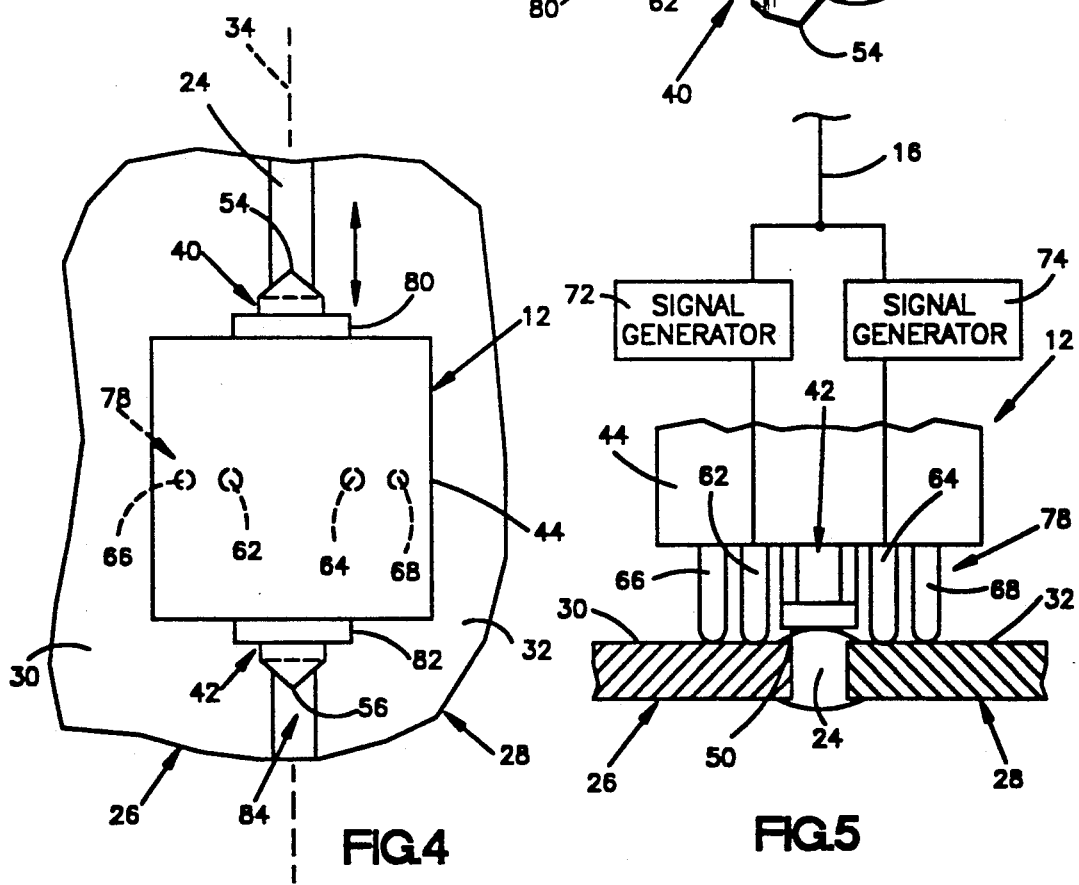

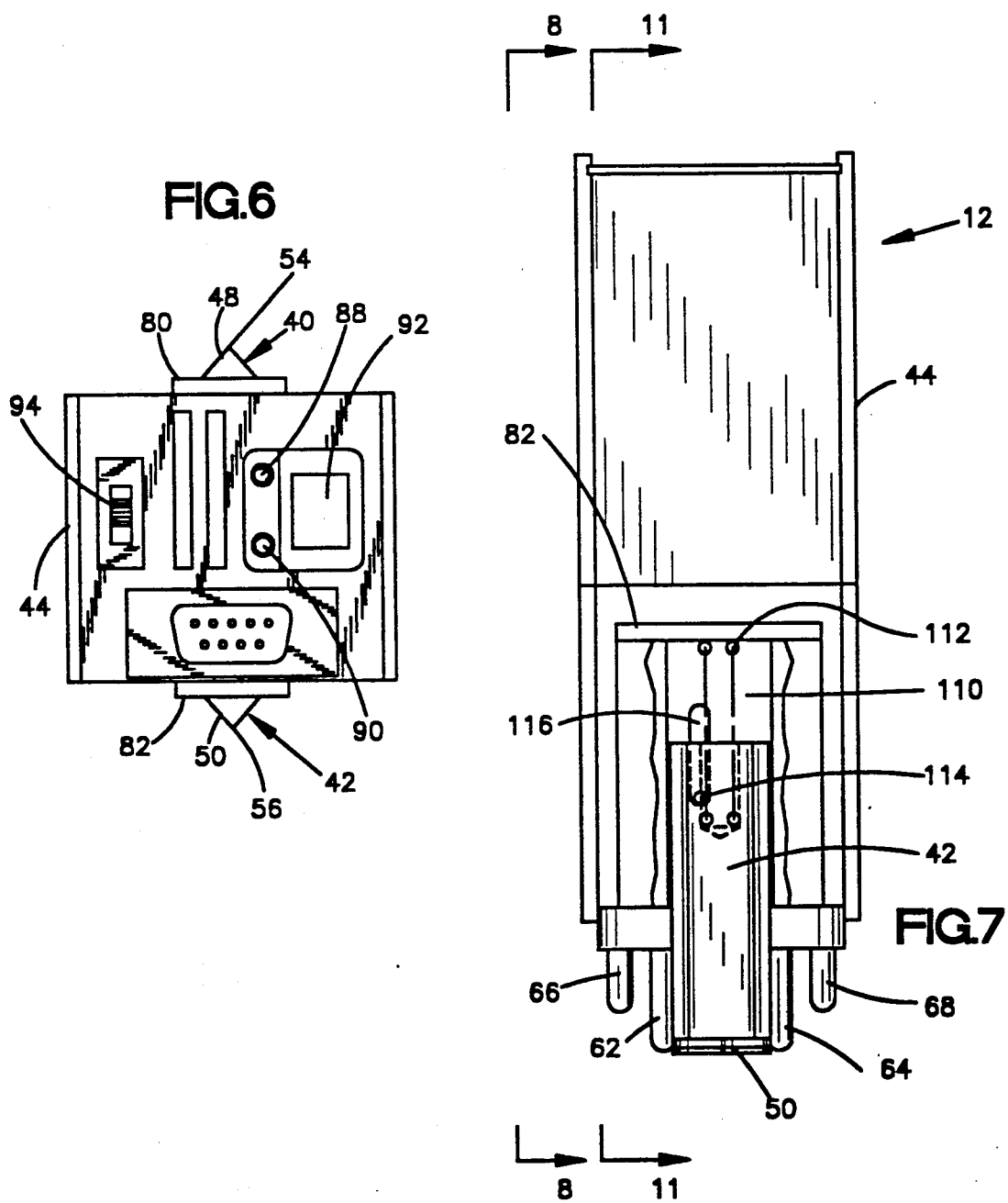

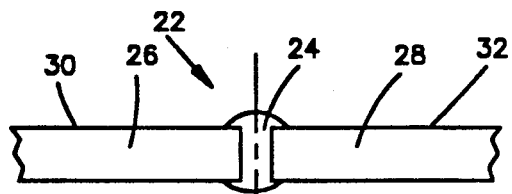
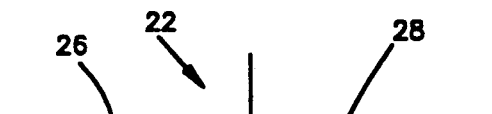
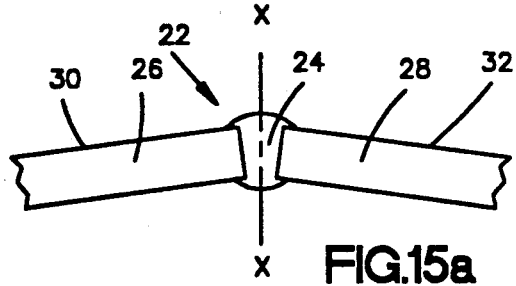
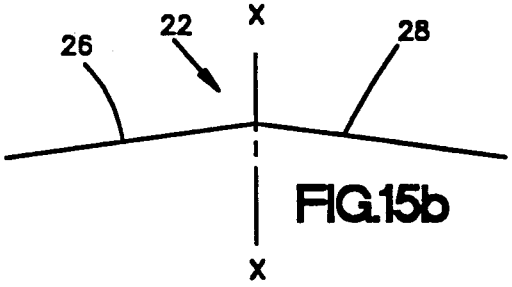
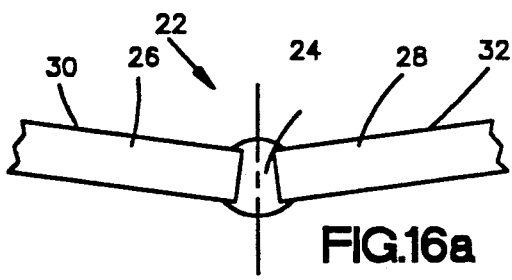
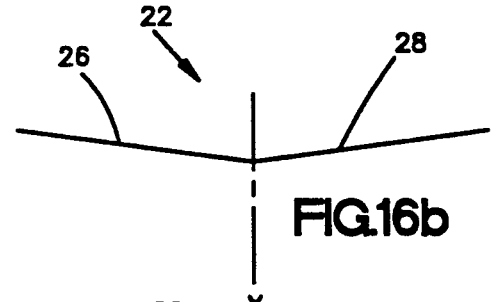
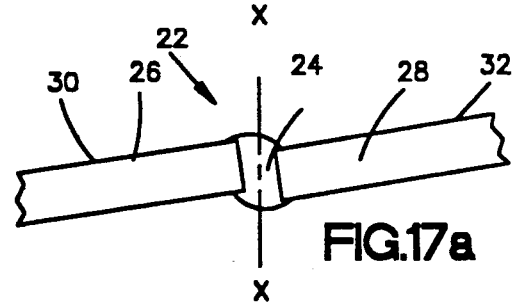
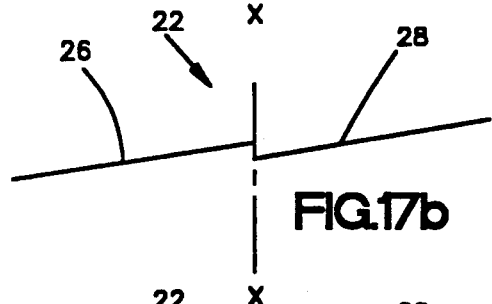
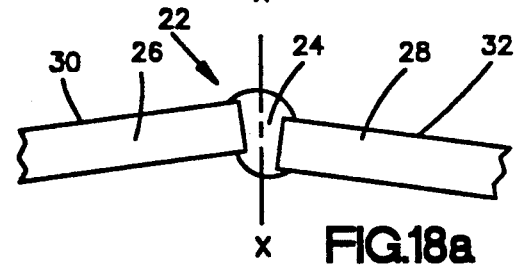
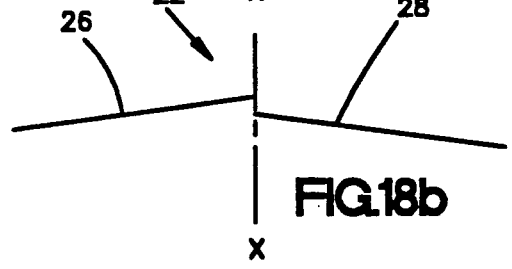
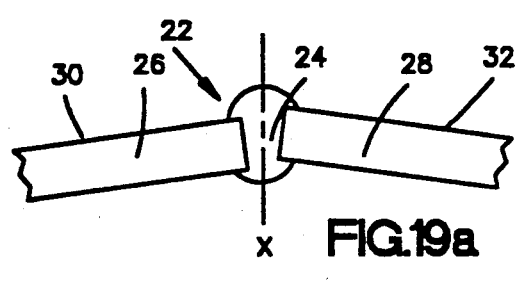
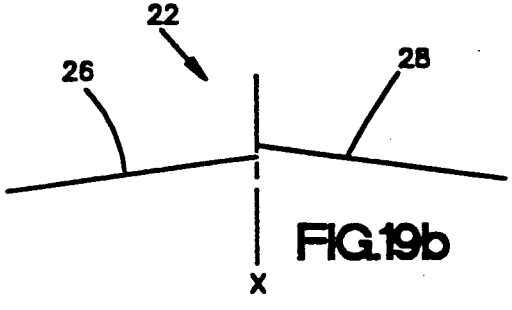

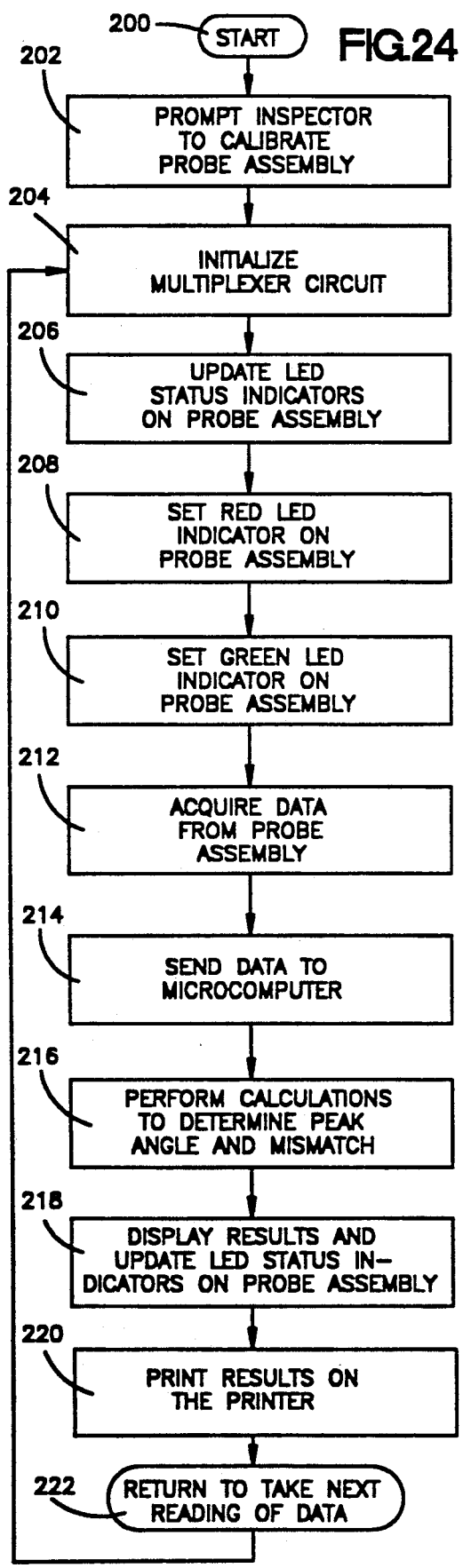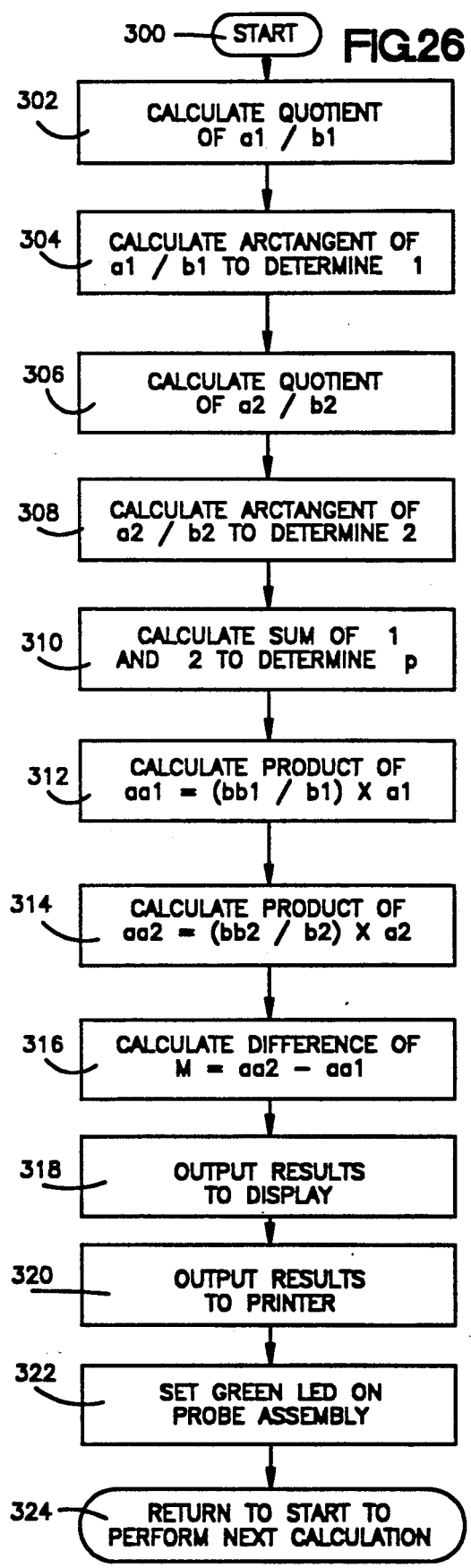

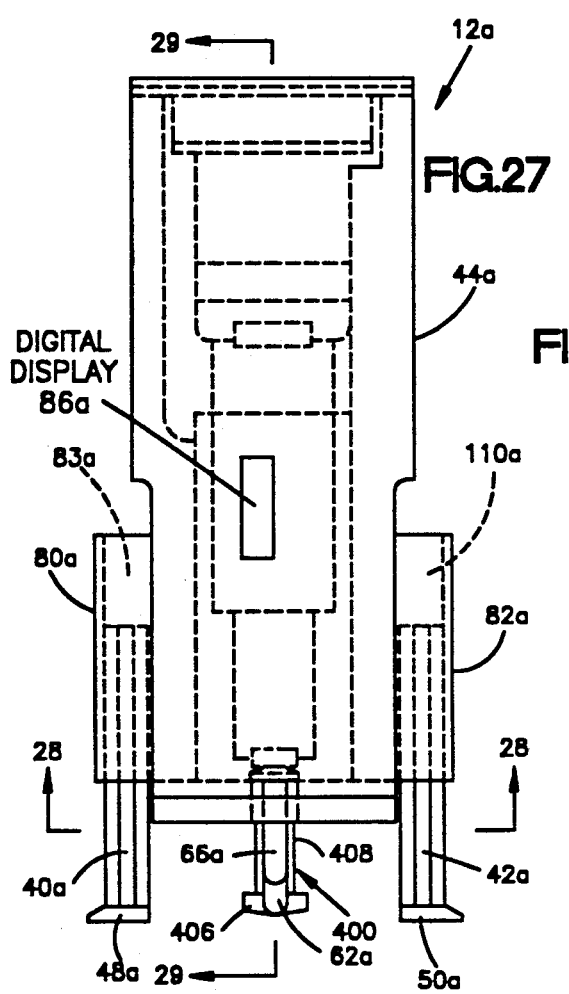
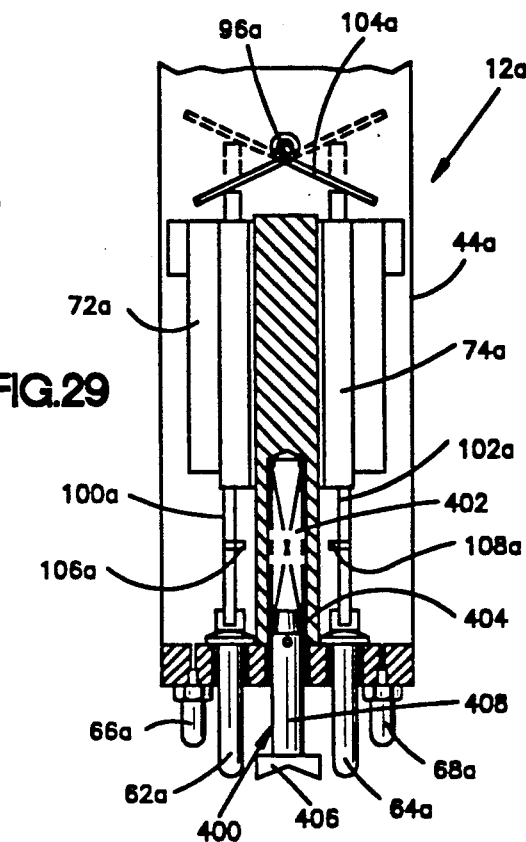
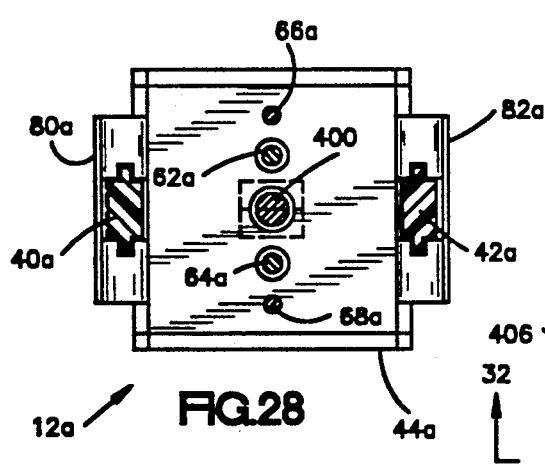
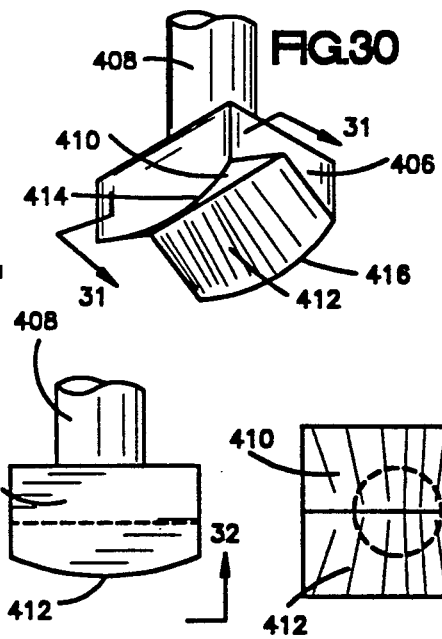

APPARATUS AND METHOD FOR USE IN INSPECTING A JOINT

BACKGROUND OF THE INVENTION

1. Technical Field

The present invention relates to an apparatus and method for inspecting a joint between plate edge portions having surfaces extending in opposite directions from the joint. The joint may be any one of many different types of joints, including a joint formed by aligning plates before the plates are interconnected. In one specific instance, the joint was a weld joint.

2. Background Art

A butt weld joint includes a weld between edge portions of two aligned pieces of metal. The weld has a longitudinally extending central axis and a transverse axis which is perpendicular to the longitudinal central axis. The transverse axis extends transversely to major side surfaces of the two aligned pieces of metal. The two pieces of metal are welded by either fusing the two pieces of metal together or adding a suitable weld material to form a joint with each piece of metal. The completed weld joint is usually characterized by a crown-like swelling known in the art as a weld bead.

Ideally, the major side surface of one piece of metal and the major side surface of the other piece of metal should align in the same plane after the two pieces of metal are welded. However, due to errors in aligning the two pieces of metal, one major side surface may lie in a first plane and the other major side surface may lie in a second plane. Each plane intersects the transverse axis of the weld at a different point. The strength of the weld joint depends, in part at least, on the accuracy with which the butted surfaces of the two pieces of metal are brought together. The strength of the weld joint is also determined by the geometry of the weld joint.

Weld geometry parameters, such as the peak angle and the mismatch, are often measured to determine the geometric configuration, and hence, strength of the weld joint. The peak angle is an angle formed by the intersection of the first and second planes. The mismatch is the distance between the intersections of the transverse axis with the first and second planes. A weld joint with geometries that do not meet the specific requirements of a particular specification, code, or standard is considered a defective weld joint.

Devices are available for determining the geometric configuration of a weld joint. Scales and gages employing conventional measuring methods can be used to determine the configuration of weld size and weld profile. Such scales and gages are commonly used in weld inspection operations.

A known device for determining the configuration of a butt weld joint is a contour-comb having teeth similar to a comb. The comb-like teeth are manually placed on the weld joint to obtain an impression profile of the weld joint. The impression profile is manually transferred to paper. The weld profile is then established through geometric construction using a straight edge and a protractor. The peak angle and the mismatch are manually calculated and compared with predetermined limit values. If the calculated values are within the predetermined limit values, then the geometry of the weld joint conforms to requirements and the weld joint passes inspection.

Inherent inaccuracies and poor resolution are drawbacks of the contour-comb method for determining the geometric configuration of the weld joint. The contour-comb method is unable to provide accurate and precise measurements of the geometric configuration of the weld joint. Furthermore, the labor intensiveness of the contour-comb method results in significant inspection costs.

Another known apparatus for determining the geometric configuration of a weld includes a hand-held probe assembly having three fixed probe legs and two movable probe legs. The three fixed probe legs engage a plate edge portion disposed on one side of a weld. The two movable probe legs engage a plate edge portion disposed on the opposite side of the weld. The three fixed probe legs are used to locate the probe assembly relative to the plate which they engage. The two movable probe legs are used to sense the location of the other plate relative to the probe assembly.

The probe assembly generates electrical signals corresponding to the positions of the movable probe legs. Using these signals and known geometric relationships, a microcomputer connected with the probe assembly calculates the peak angle and the mismatch of the weld joint. The microcomputer then compares the calculated values of the peak angle and the mismatch with predetermined limit values stored in a memory. If the calculated values are within the predetermined limit values, the weld passes inspection.

One drawback of this known apparatus is its lack of capability to determine the configuration of a weld joint which is longitudinally and transversely contoured. This known apparatus is capable of determining the configuration of a weld joint which is contoured in only one direction, that is in either the longitudinal or the transverse direction. Another drawback of this apparatus is the difficulty in accurately positioning the probe assembly in a direction transverse to a longitudinal axis of a weld. Still another drawback of this known apparatus is the relatively high cost of the probe assembly.

SUMMARY OF THE INVENTION

The present invention relates to an apparatus and method which can be used to inspect many different types of joints. Thus, the apparatus and method of the present invention can be used to inspect joints between plates which are interconnected by welding, or riveting or glueing, as well as open joints between plates which are merely aligned with each other before being interconnected. The apparatus and method can be used to determine the configuration of a joint which is contoured in both the longitudinal and the transverse directions.

The apparatus includes a fixed probe leg and a movable probe leg which engages a plate edge portion on one side of a joint and a fixed probe leg and a movable probe leg which engages a plate edge portion on the opposite side of the joint. The fixed and movable probe legs are advantageously disposed in a linear array. A signal generator provides an output which is a function of the positions of the movable probe legs. This output can be used to determine the configuration of the joint.

In order to facilitate accurate positioning of the probe legs relative to the joint, the joint may be engaged by one or more alignment legs. Thus, in one embodiment of the invention, the joint is engaged by alignment legs disposed on opposite sides of the linear array of probe legs. In another embodiment of the invention, the joint is engaged by an alignment leg disposed in a central portion of the linear array of probe legs. One or more of the alignment legs may be provided with surfaces to engage opposite sides of the joint to hold the probe legs against transverse movement relative to the joint. To accommodate various joint configurations, the alignment legs are advantageously retractable.

BRIEF DESCRIPTION OF THE DRAWINGS

The foregoing and other features and advantages of the present invention will become apparent to one skilled in the art to which the present invention relates from reading the following description of preferred embodiments in conjunction with the accompanying drawings, wherein:

FIG. 3 is a perspective view illustrating the construction of the probe assembly of FIG. 2;

FIG. 4 is a somewhat schematized view, taken generally along the line 4—4 of FIG. 2, further illustrating the relationship between the joint being inspected and the probe assembly;

FIG. 5 is a schematic illustration, taken generally along the line 5—5 of FIG. 2, further illustrating the relationship between the joint being inspected and probe legs and alignment legs of the probe assembly;

FIG. 6 is an end view, taken generally along the line 6—6 of FIG. 3, illustrating controls at one end of the hand-held probe assembly;

FIG. 7 is a partially broken away side view, taken generally along the line 7—7 of FIG. 3, illustrating the relationship of a retractable alignment leg to an upright housing of the probe assembly;

FIGS. 14a and 14b are sectional and schematic illustrations, respectively, of a joint having a zero peak angle and a zero mismatch;

FIGS. 15a and 15b are sectional and schematic illustrations, respectively, of a joint having a positive peak angle and a zero mismatch;

FIGS. 16a and 16b are sectional and schematic illustrations, respectively, of a joint having a negative peak angle and a zero mismatch;

FIGS. 17a and 17b are sectional and schematic illustrations, respectively, of a joint having a zero peak angle and a positive mismatch;

FIGS. 18a and 18b are sectional and schematic illustrations, respectively, of a joint having a positive peak angle and a positive mismatch;

FIGS. 19a and 19b are sectional and schematic illustrations, respectively, of a joint having a positive peak angle and a negative mismatch;

FIG. 24 is a program flowchart diagram for a microcomputer used in the apparatus of FIG. 1;

FIG. 26 is a program flowchart diagram for determining the peak angle and the mismatch of a joint using the geometric relationships of FIG. 25;

FIG. 27 is a side view, generally similar to FIG. 8, illustrating a second embodiment of the probe assembly;

FIG. 28 is an end view, taken generally along the line 28—28 of FIG. 27 illustrating the relationship between a plurality of alignment legs and a plurality of probe legs;

FIG. 29 is a sectional view, taken generally along the line 29—29 of FIG. 27, illustrating the relationship between a central alignment leg, a plurality of probe legs and a pair of signal generators;

FIG. 30 is a pictorial illustration of an end portion of the central alignment leg shown in FIG. 29;

FIG. 31 is a side view, taken generally along the line 31—31 of FIG. 30, further illustrating the construction of the end portion of the central alignment leg; and FIG. 32 is an end view, taken generally along the line 32—32 of FIG. 31, illustrating the relationship between joint engaging surfaces on the end portion of the central alignment leg.

DESCRIPTION OF PREFERRED EMBODIMENTS

General Description

Figure 1:
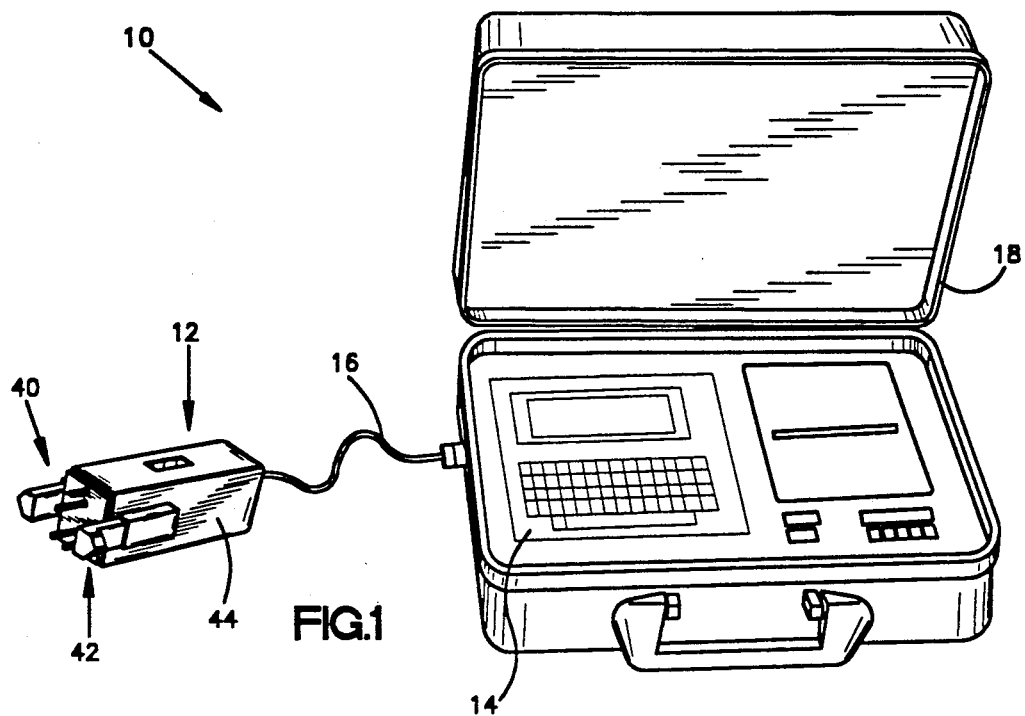
FIG. 1 is a perspective view of an apparatus, constructed in accordance with the present invention, for use in inspecting a joint.

An apparatus 10 for use in inspecting a joint is illustrated in FIG. 1. The apparatus 10 includes a probe assembly 12 which is connected with a microcomputer 14 by a cable 16. The microcomputer 14 is disposed in a carrying case 18 in which the probe assembly 12 can be stored.

Figure 2:
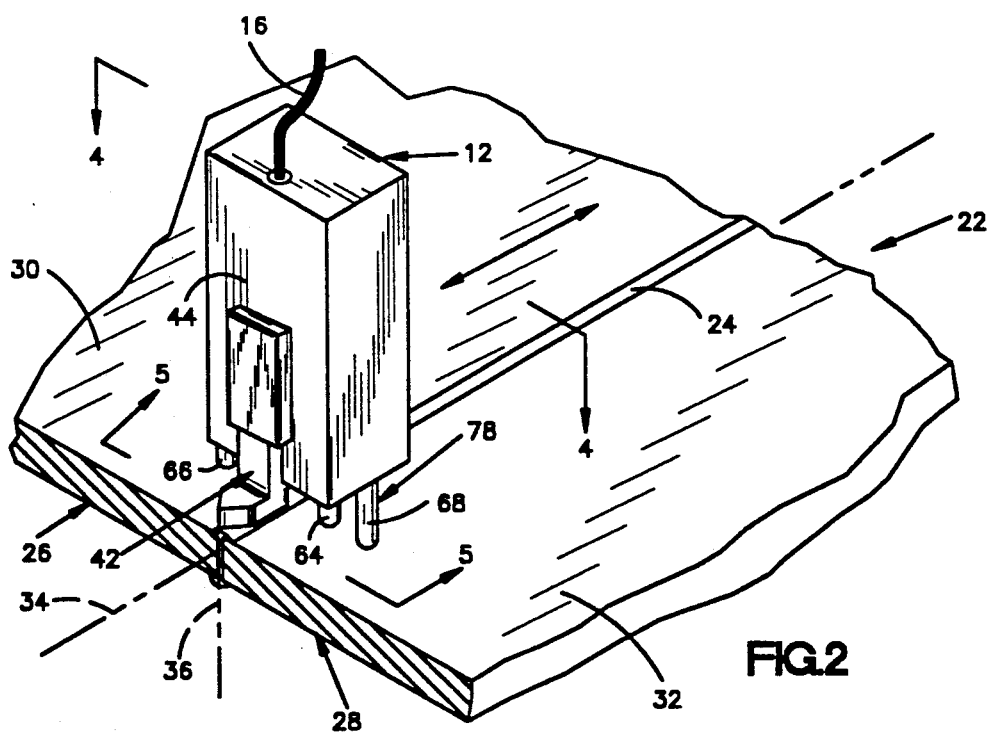
FIG. 2 is a pictorial view illustrating the relationship between a probe assembly of the apparatus of FIG. 1 and a joint which is being inspected.
Figure 8:
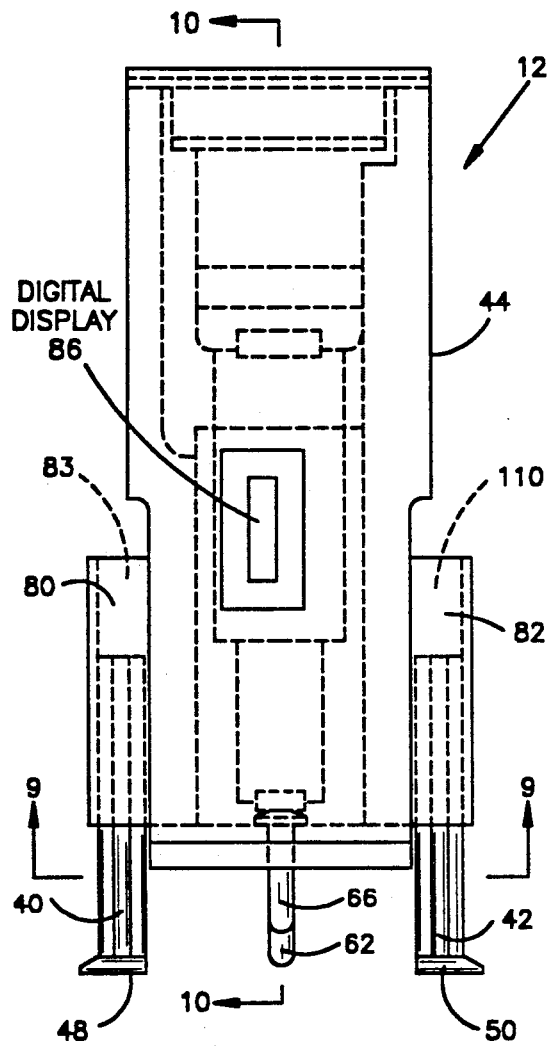
FIG. 8 is a side view, taken generally along the line 8—8 of FIG. 7, further illustrating the relationship of alignment legs and probe legs to the housing of the probe assembly.
Figure 10:
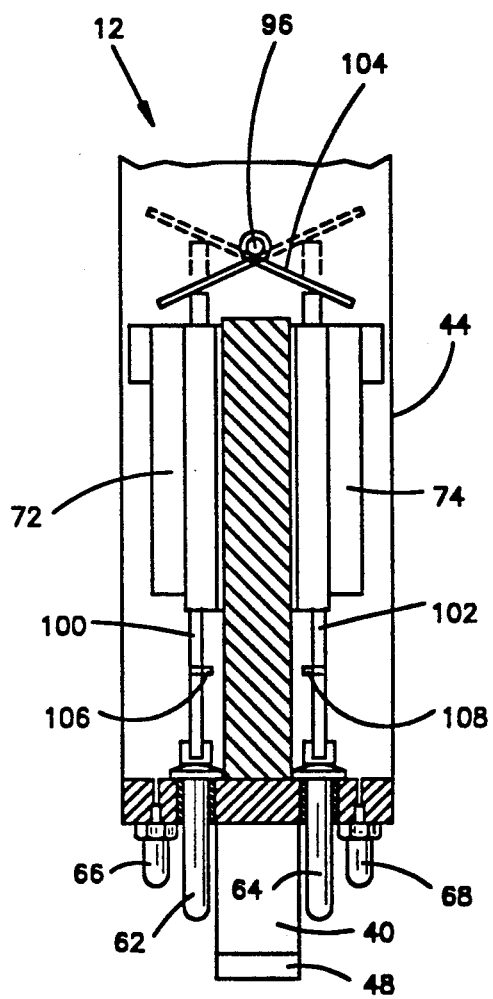
FIG. 10 is a partially broken away sectional view, taken generally along the line 10—10 of FIG. 8, illustrating the relationship between a pair of movable probe legs and a pair of signal generators.
Figure 9:
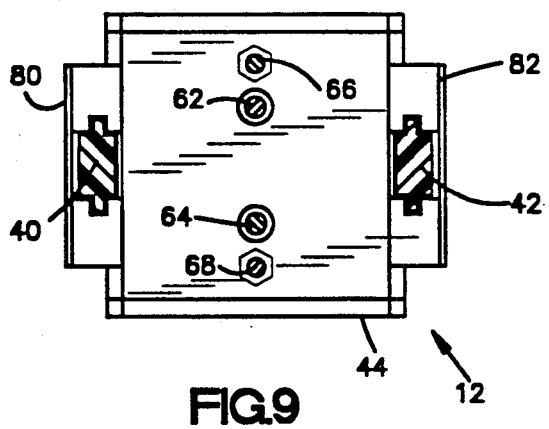
FIG. 9 is an end view, taken generally along the line 9—9 of FIG. 8, further illustrating the relationship of the alignment legs and probe legs to the housing of the probe assembly.
Figure 11:
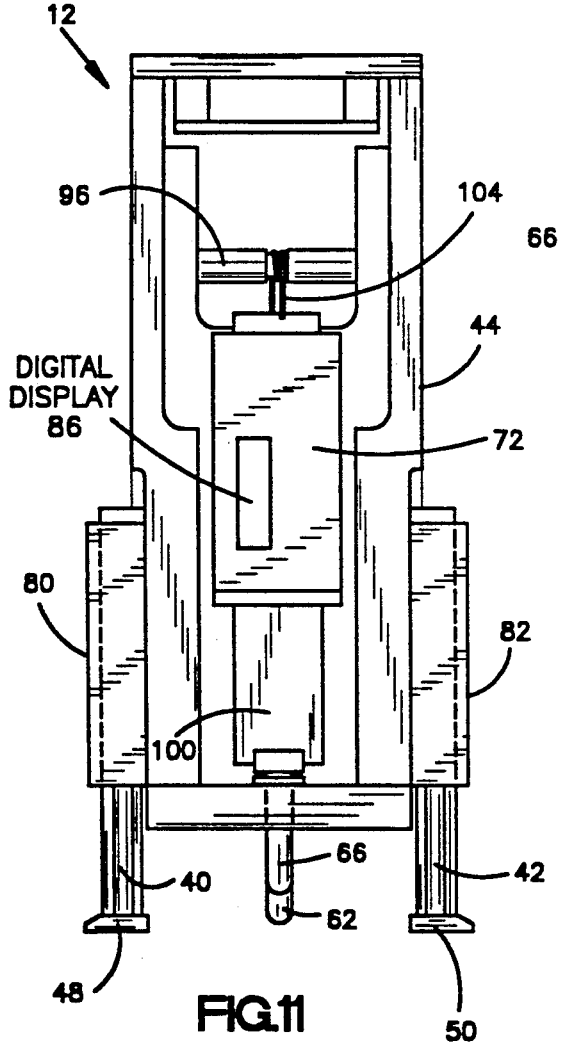
FIG. 11 is a side view, taken generally along the line 11—11 of FIG. 7, illustrating the relationship of one of the signal generators to the housing, probe legs and alignment legs.

The apparatus 10 can be used to inspect many different types of joints. However, the apparatus 10 will be described herein in conjunction with the inspection of a weld joint 22 (FIG. 2). The weld joint 22 includes a weld 24 which interconnects a pair of flat plate edge portions 26 and 28. The plate edge portions 26 and 28 have upper (as viewed in FIG. 2) major side surfaces 30 and 32 which extend in opposite directions from the weld 24.

The weld 24 has a straight longitudinal central axis 34 and a transverse central axis 36. The transverse central axis 36 is perpendicular to the longitudinal central axis 34 and intersects the longitudinal central axis 34 at the center of the weld 24 and midway between edges of the plates 26 and 28. Although a linear weld joint 22 is illustrated in FIG. 2, it should be understood that the joint could have a nonlinear configuration and/or that the major side surfaces 30 and 32 of the plate edge portions 26 and 28 could be contoured. Thus, plate edge portions 26 and 28 could be part of segments of a structure having a generally hemispherical configuration. It should also be understood that the joint to be inspected could be formed in many different ways, including merely placing the plate edge portions 26 and 28 in alignment with each other before interconnecting the plates.

When a joint, such as the weld joint 22 is to be inspected, the probe assembly 12 is manually moved to a location adjacent to the weld 24. A pair of retractable alignment legs 40 and 42 (FIG. 3) extending outwardly from one end of a rectangular probe housing 44 are aligned with the weld 24 in the manner shown in FIG. 4. The probe 12 is then manually moved downwardly until flat bottom surfaces 48 and 50 (FIG. 3) on the alignment legs 40 and 42 abuttingly engage the weld 24 in the manner shown schematically in FIG. 5 for the alignment leg 42.

The alignment legs 40 and 42 have pointer tips 54 and 56 (FIG. 4) which are aligned with the longitudinal central axis 34 of a joint. In the case of weld joint 22, the pointer tips 54 and 56 are aligned with the weld 24 (FIG. 4) to accurately position the probe assembly 12 relative to the weld. Since the alignment legs 40 and 42 are disposed in abutting engagement with the weld 24, it is easy for an operator to visually align the probe assembly 12 with the weld. However, if desired, the alignment legs 40 and 42 could be provided with side surfaces which engage opposite longitudinally extending side surfaces of the weld 24 to align the probe assembly 12 with the weld. When a joint to be inspected does not have a weld 24, the pointer tips 54 and 56 on the alignment legs 40 and 42 are aligned with the longitudinal axis of the joint.

When the probe assembly 12 is aligned with a joint, such as the weld joint 22, a vertical (as viewed in FIGS. 2 and 5) central axis of the probe assembly extends through the longitudinal central axis 34 of the joint and is coincident with the transverse axis 36 of the joint. As the probe assembly 12 is moved downwardly (as viewed in FIGS. 2 and 5), the alignment legs 40 and 42 retract and movable or retractable probe legs 62 and 64 (FIGS. 3 and 5) move into engagement with the flat major upper side surfaces 30 and 32 of the plate edge portions 26 and 28. During continued movement of the probe assembly 12 toward the plate edge portions 26 and 28, fixed probe legs 66 and 68 move into abutting engagement with the major side surfaces 30 and 32 of the plate edge portions 26 and 28 in the manner illustrated in FIGS. 2 and 5.

Engagement of the fixed probe legs 66 and 68 with the major side surfaces 30 and 32 positions the probe assembly 12 vertically relative to the plate edge portions 26 and 28 by blocking further downward movement of the probe assembly 12. At this time, one fixed probe leg and one movable probe leg engages each of the plate edge portions 26 and 28. Thus, the fixed probe leg 66 (FIG. 5) and the movable probe leg 62 engage the plate edge portion 26. The fixed probe leg 68 and the movable probe leg 64 engage the plate edge portion 28.

A pair of signal generators 72 and 74 are connected with the movable probe legs 62 and 64 in the manner indicated schematically in FIG. 5. The output from the signal generators 72 and 74 is conducted through the cable 16 (FIG. 1) to the microprocessor 14. The output from the signal generators 72 and 74 is indicative of the extent of movement of the movable probe legs 62 and 64 relative to the housing 44 and fixed probe legs 66 and 68. The microprocessor 14 uses the output from the signal generators 72 and 74 to calculate the peak angle and the mismatch between the plate edge portions 26 and 28.

The probe legs 62, 64, 66 and 68 are disposed in a linear array 78 (FIG. 3) which is located midway between the alignment legs 40 and 42. The central axis of the linear array 78 of probe legs 62, 64, 66 and 68 extends perpendicular to the longitudinal central axis 34 of the joint 22 when the probe assembly 12 is aligned with the centerline of the joint in the manner illustrated in FIGS. 2 and 4. By having the probe legs 62, 64, 66 and 68 disposed in the linear array 78, the accuracy with which the output from the signal generators 72 and 74 indicates the peak angle and mismatch of the plate edge portions 26 and 28 is not effected by the weld 24 having an arcuately curving longitudinal central axis 34. This is because the linear array 78 of probe legs engages the plate edge portions 26 and 28 along a line which is perpendicular to the longitudinal central axis 34 of the weld 24.

In order to facilitate understanding of the invention, the foregoing explanation has been in conjunction with one specific type of joint, that is, the weld joint 22. However, the invention is applicable to other types of joints that involve plate alignment. For example, the apparatus 10 could be used to facilitate the making of engineering decisions on how to adjust parts during assembly. The apparatus 10 could also be used to inspect a joint between surfaces on a one-piece article, such as an extrusion.

Probe Assembly

Referring to FIG. 1, the hand-held probe assembly 12 can be stored in the carrying case 18. The carrying case 18 is of a conventional design and manufacture. The probe assembly 12 is electrically connectable through the cable 16 to the microcomputer 14. The probe assembly 12 is used for sensing and acquiring data associated with the geometric configuration of the joint being inspected. The probe assembly 12 generates an electrical output signal corresponding to the geometric configuration of the joint being inspected. This electrical output signal is transmitted to the microcomputer 14.

Referring to FIG. 3, the probe assembly 12 includes the pair of retractable, spring-loaded, alignment legs 40, 42. The alignment leg 40 is retractable into a housing portion 80 of the probe assembly 12. The alignment leg 42 is retractable into a housing portion 82 of the probe assembly 12. Each of the alignment legs 40, 42 is movable from an extended position to a retracted position. The two alignment legs 40, 42 are spaced apart and disposed in a linear array 84 (FIG. 4). The linear array 84 of alignment legs 40 and 42 extends perpendicular to the linear array 78 of the probe legs 62, 64, 66, and 68 and is located midway between the probe legs 62 and 64.

The alignment leg 40 has the flat bottom surface 48 (FIG. 3) at one end of the alignment leg 40. Similarly, the alignment leg 42 has a flat bottom surface 50 at one end of the alignment leg 42. When the weld joint 22 is being inspected, the two flat bottom surfaces 48, 50 engage the weld 24 (FIG. 2) when the probe assembly 12 is positioned on the joint 22. The alignment leg 40 has a pointer tip 54. Similarly, alignment leg 42 has a pointer tip 56. The pointer tips 54, 56 aid an inspector in positioning and aligning the probe assembly 12 on the joint being inspected. When a joint other than a weld joint is to be inspected, the pointer tips 54 and 56 could be modified to suit the particular characteristics of the joint to be inspected.

Each of the probe legs 62, 64, 66 and 68 has a cylindrical shape and is made of metal. The two probe legs 66, 68 are fixed and the two probe legs 62, 64 are movable. The two movable probe legs 62, 64 are axially retractable from an extended position to a retracted position relative to the rectangular housing 44. The probe legs 66, 68, 62, 64 are spaced apart and disposed in the linear array 78 transverse to the linear array 84 of the alignment legs 40, 42.

Referring to FIGS. 6 through 11, the specific construction of the probe assembly 12 is illustrated. The probe assembly 12 includes a digital display 86 (FIG. 8) located on the side of the probe assembly 12. When the microprocessor 14 is not ready to receive an input from the probe assembly 12, a red light-emitting diode ("LED") status indicator 88 (FIG. 6) and/or an audible signal generator is energized. When the microprocessor is ready to receive an input from the probe assembly 12, a green LED status indicator 90 (FIG. 6) is energized. A reading by the probe assembly 12 is initiated by actuating a switch 92. A slidable calibration switch 94 is also located on this one end of the probe assembly 12.

The probe assembly 12 includes the rectangular housing 44 formed of a polymeric material. A cross member 96 (FIGS. 10 and 11) is supported at its two ends by the housing 44. The signal generator 72 and the signal generator 74 (FIG. 10) are connected to the housing 44 and mounted on opposite sides of the cross member 96. Each of the signal generators 72, 74 includes a slidable actuating member 100, 102, respectively, which slides within the signal generator.

The movable probe leg 62 (FIG. 10) is connected to the lower end of the slidable member 100 of the signal generator 72. The movable probe leg 64 is connected to the lower end of the slidable member 102 of the signal generator 74. One end of a torsion spring 104 abuts against the upper end of the slidable member 100 of the signal generator 72 to urge the slidable member 100 towards the movable probe leg 62. The other end of the torsion spring 104 abuts against the upper end of the slidable member 102 of the signal generator 74 to urge the slidable member 102 towards the movable probe leg 64. Thus, the force of the torsion spring 104 biases each of the movable probe legs 62, 64 to an initial or extended position relative to the housing 44 of the probe assembly 12.

It should be understood that the initial or extended positions (FIG. 10) of the movable probe legs 62, 64 is different than arbitrarily selected zero or set positions from which displacement of the movable probe legs is measured. The movable probe legs 62, 64 are in their zero or set positions when they are aligned with the fixed probe legs 66 and 68. Calibration of the probe assembly 12 to a zero or set position is accomplished by pressing a flat plate against the movable probe legs 62, 64 to retract them until the plate engages the fixed probe legs 66, 68. When the flat plate engages the ends of both the movable and fixed probe legs 62, 64 and 66, 68, the movable probe legs are in the zero or set position. If the movable probe legs 62, 64 are retracted past the zero or set position, it is referred to as positive displacement. If the movable probe legs are extended outwardly from the zero or set position, it is referred to as negative displacement.

When a force is applied to the tip of the movable probe leg 62 to push the probe leg 62 toward the housing 44, the slidable member 100 moves through the signal generator 72 and against the biasing force of the torsion spring 104. The probe leg 62 is movable inwardly from a fully extended position, through its zero or set position, to a fully retracted position. The extent of movement of the probe leg 62 in the retraction direction is limited by a roll pin 106 inserted through a hole in the slidable member 100. The extent of displacement of the probe leg 62 in either direction from its zero or set position is indicated on the digital display 86 located on the side of the probe assembly 12.

Similarly, when a force is applied to the tip of the movable probe leg 64 into the housing 44, the slidable member 102 moves through the signal generator 74 and against the biasing force of the torsion spring 104. The probe leg 64 is movable inwardly from a fully extended position, through its zero or set position, to a fully retracted position. The extent of movement of the probe leg 64 in the retraction direction is limited by a roll pin 108 inserted through a hole in the slidable member 102. The extent of displacement of the probe leg 64 in either direction from its zero or set position is indicated on the digital display 86 located on the side of the probe assembly 12.

In one specific embodiment of the probe assembly 12, the signal generators 72 and 74 were noncontact linear displacement measuring devices which are commercially available under Order No. 500-216 from MTI Corporation (Mitutoyo) of 2410 Gateway Drive, Irving, Tex. 75062. Of course, other known types of signal generators could be used if desired.

The housing portion 80 (FIGS. 8, 9 and 10) and the housing portion 82 are fixedly connected to the housing 44. Each of the housing portions 80, 82 is located on opposite sides of the housing 44. The housing portion 82 includes a spring chamber 110 (FIG. 7) with a compression spring 112 disposed therein. The spring 112 abuts against the alignment leg 42 and urges the alignment leg 42 in a direction away from the housing portion 82. The alignment leg 42 has the flat bottom surface 50 at the other end of the alignment leg 42.

When the alignment leg 42 is pushed into the housing portion 82, the spring 112 compresses so as to allow the alignment leg 42 to move from its initial or fully extended position to a retracted position. A dowel pin 114 (FIG. 7) is connected to the alignment leg 42 to limit the extent of travel of the alignment leg 42 in the retraction direction. The dowel pin 114 is movable between the ends of a slot 116 in the housing portion 82.

The housing portion 80 (FIGS. 8, 9 and 10) is constructed in a similar manner to the housing portion 82. The housing portion 80 includes a spring chamber 83 with a compression spring (not shown) disposed therein. The spring abuts against the alignment leg 40 and urges the alignment leg 40 in a direction away from the housing portion 80. The alignment leg 40 has the flat bottom surface 48 disposed at the other end of the alignment leg 40.

When the alignment leg 40 is pushed into the housing portion 80, the spring compresses so as to allow the alignment leg 40 to move from an initial or fully extended position to a retracted position. A dowel pin (not shown) is connected to the alignment leg 40 to limit the extent of travel of the alignment leg 40 in the retraction direction. This dowel pin is movable between the ends of a slot (not shown) in the housing portion 80.

Figure 12:
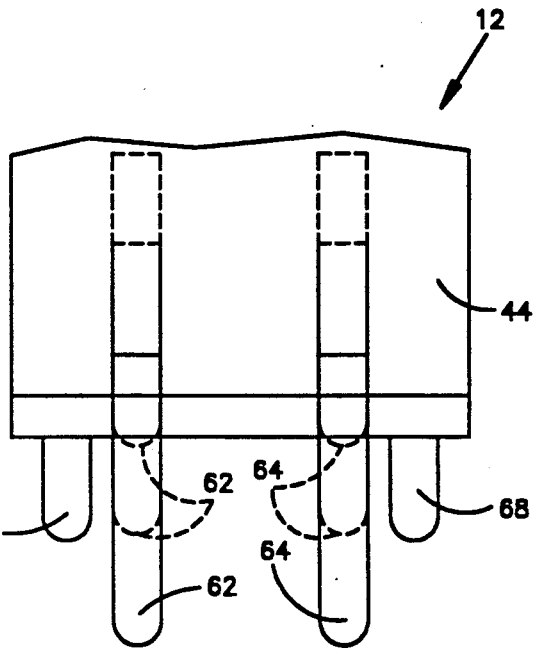
FIG. 12 is a schematic illustration depicting the manner in which a pair of movable probe legs are moved between extended and retracted positions.

Referring to FIG. 12, the two movable probe legs 62, 64 are schematically illustrated, in solid lines, in their initial or fully extended positions. The two movable probe legs 62, 64 are retractable inwardly to their zero or set positions, indicated in dashed lines in FIG. 12, in which the ends of the movable probe legs are aligned with the ends of the fixed probe legs 66, 68. The two movable probe legs 62, 64 are retractable inwardly from their zero or set positions to their fully retracted positions, also indicated in dashed lines in FIG. 12.

The physical dimensions of the probe legs relative to each other are approximately as follows. The distance between the housing 44 of the probe assembly 12 and the tip of each of the fixed probe legs 66, 68 is one-half inch. The distance between the housing 44 of the probe assembly 12 and the tip of each of the fully extended movable legs 62, 64 is twice the length of the fixed probe legs 66, 68, or one inch. The center-to-center distance between the two movable probe legs 62, 64 is 0.45 inches. The center-to-center distance between the two fixed probe legs 66, 68 is 0.75 inches. These dimensions are only approximate dimensions and have been set forth herein for purposes of clarity of description of the illustrated embodiment of the invention and not for the purposes of limiting the invention.

Figure 13:
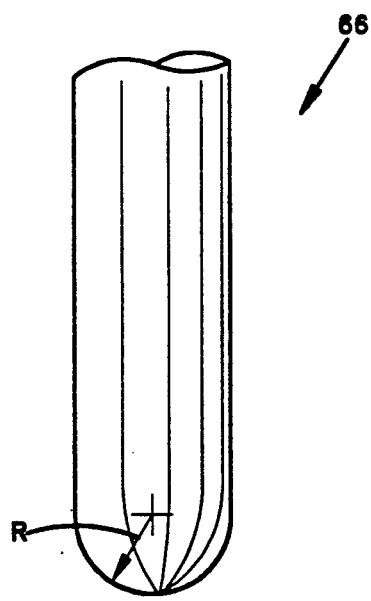
FIG. 13 is an enlarged view of an end portion of a probe leg.

An enlarged illustration of the cylindrical probe leg 66 is shown in FIG. 13. The tip of the probe leg 66 has a surface for engaging a major side surface of one of the plate edge portions of a weld joint. The surface at the tip of the probe leg 66 is of a constant radius, designated as "R" in FIG. 13, and has a hemispherical configuration. By having the surface at the tip of the probe leg 66 as a constant radius, the sensitivity to the angular orientation of a plate edge portion to the probe leg 66 is minimized. The specific construction of the tip of each of the other three cylindrical probe legs 68, 62, 64 is identical to the probe leg 66. When the movable probe legs 62, 64 and the alignment legs 40, 42 are in their extended positions, the distance between the tip of each of the movable probe legs 62, 64 and the housing 44 is less than the distance between the flat bottom surfaces 48, 50 of the alignment legs 40, 42 and the housing 44.

Weld Geometry

Referring to FIGS. 2, 4 and 5, the weld 24 of the weld joint 22 interconnects the flat plate edge portions 26 and 28. The upper major side surfaces 30 and 32 of the flat plate edge portions 26 and 28 extend in opposite directions from the weld 24. The transverse central axis 36 (FIG. 2) of the weld 24 is perpendicular to the longitudinal central axis 34 of the weld 24. The transverse central axis 36 intersects the longitudinal central axis 34 at the center of the weld 24 at a location midway between edges of the plates 26 and 28.

For simplicity of explanation purposes, the butt weld joint 22 illustrated in FIGS. 2, 4 and 5 was assumed to have a zero peak angle and a zero mismatch. For convenience, this butt weld joint 22 is reproduced in FIG. 14a. FIG. 14b is a schematic diagram of the butt weld joint 22 of FIG. 14a. The butt weld joint 22 of FIG. 14a has the weld 24 interconnecting the two plate edge portions 26, 28. The plate edge portion 26 has the upper major side surface 30 extending in a direction away from the weld 24. The plate edge portion 28 has the upper major side surface 32 extending in a direction away from the weld 24 and opposite to that of the major side surface 30 of the plate edge portion 26.

The butt weld joint 22 may have a nonzero peak angle and a nonzero mismatch. The butt weld joint 22 having a positive peak angle and a zero mismatch is shown in FIG. 15a. The schematic diagram of the butt weld joint 22 of FIG. 15a is shown in FIG. 15b. The butt weld joint 22 having a negative peak angle and a zero mismatch is illustrated in FIG. 16a. The schematic diagram corresponding to the butt weld joint 22 having a negative peak angle and a zero mismatch is shown in FIG. 16b. The butt weld joint 22 having a zero peak angle and a positive mismatch is shown in FIG. 17a. The schematic diagram is shown in FIG. 17b. The butt weld joint 22 having a positive peak angle and a positive mismatch is shown in FIG. 18a, and the corresponding schematic diagram is shown in FIG. 18b. The butt weld joint 22 having a positive peak angle and a negative mismatch is shown in FIG. 19a. The corresponding schematic diagram is shown in FIG. 19b.

Although only butt weld joint configurations have been illustrated in FIGS. 14–19, other types of joints may have similar configurations For example, prior to making the welds 24 between the plate edge portions 26, 28, the plate edge portions were positioned relative to each other to form joints which had the same configuration as the weld joints. By using the apparatus 10 to inspect the joints between the plate edge portions 26 and 28 prior to welding, the formation of unsatisfactory welds may be avoided.

Use of Probe Assembly

The manner in which the probe assembly 12 is used to inspect a joint is illustrated in FIGS. 2, 4 and 5. Prior to inspection of a joint, the probe assembly 12 is calibrated to be certain that the digital display 86 and microcomputer 14 provide zero readings when the movable probe legs 62 and 64 are at their set or zero positions. This is accomplished by using a flat test or calibration plate to move the probe legs 62 and 64 into alignment with the fixed probe legs 66 and 68 in the manner previously explained.

When it is desired to inspect the joint 22, an inspector positions and aligns the probe assembly 12 on the weld 24 of the weld joint 22 with the aid of the pointer tips 54, 56 on the alignment legs 40, 42. After the probe assembly 12 is positioned and aligned on the weld 24, the inspector presses the probe assembly 12 in a downwardly direction towards the weld 24. The two alignment legs 40, 42 begin to retract from their extended positions. While the alignment legs 40, 42 are retracting, the inspector continues to press the probe assembly 12 in the downwardly direction towards the weld 24.

Eventually, the tip of one of the movable probe legs 62, 64 engages one of the major side surfaces 46, 48. When this occurs, this one movable probe leg begins to move from its extended position. As the alignment legs 40, 42 and the one movable leg continue to retract, the tip of the other movable probe leg eventually engages the other major side surface. The two alignment legs 40, 42 and the two movable legs 62, 64 continue retracting until the tips of the two fixed legs 66, 68 engage the major side surfaces 30 and 32 of the plate edge portions 26 and 28.

As shown in FIGS. 2, 4 and 5, the two fixed legs 66, 68 are in engagement with the major side surfaces 30, 32, respectively. The two movable legs 62, 64 are in engagement with the major side surfaces 30, 32, respectively. The movable probe leg 62 is moved from its extended position to a retracted position so as to conform with the profile of the weld joint 22. The movable probe leg 64 is moved from its extended position to a retracted position so as to conform to the profile of the weld joint 22. The weld joint 22 is illustrated in FIGS. 5, 14a and 14b having a zero peak angle and a zero mismatch.

After the probe assembly 12 is positioned and aligned on the weld joint 22, a reading of weld profile data can be taken. To take a reading of data, the inspector operates the switch 92 on the probe assembly 12 while holding the probe assembly 12 on the weld joint 22. The microcomputer 14 reads the weld joint configuration sensed by the probe assembly 12 and generates electrical output signals corresponding to the weld joint configuration sensed by the probe assembly.

Figure 20:
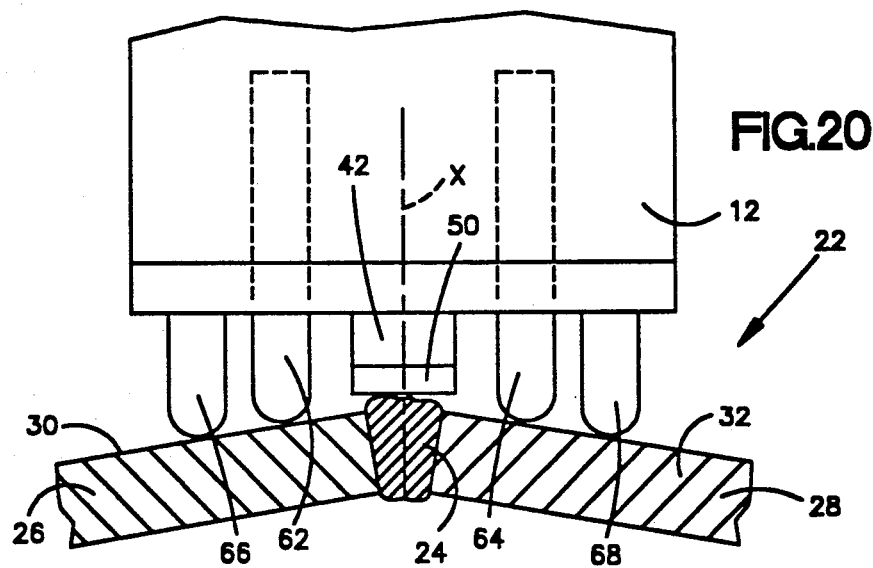
FIG. 20 is a schematic illustration of the relationship between the probe legs, alignment legs, and the joint of FIGS. 15a and 15b as the joint is being inspected.

Referring to FIG. 20, the weld joint 22 is shown as having a positive peak angle and a zero mismatch. The peak angle formed between the two major side surfaces 30, 32 is shown exaggerated for illustrative purposes When the flat bottom surfaces 48, 50 of the alignment legs 40, 42 and ends of the probe legs 66, 68, 62, 64 are engaged with the weld joint 22 having a positive peak angle, the two movable legs 62, 64 are retracted more into the probe assembly 12 than would be the case for a weld joint 22 having a zero peak angle.

Figure 21:
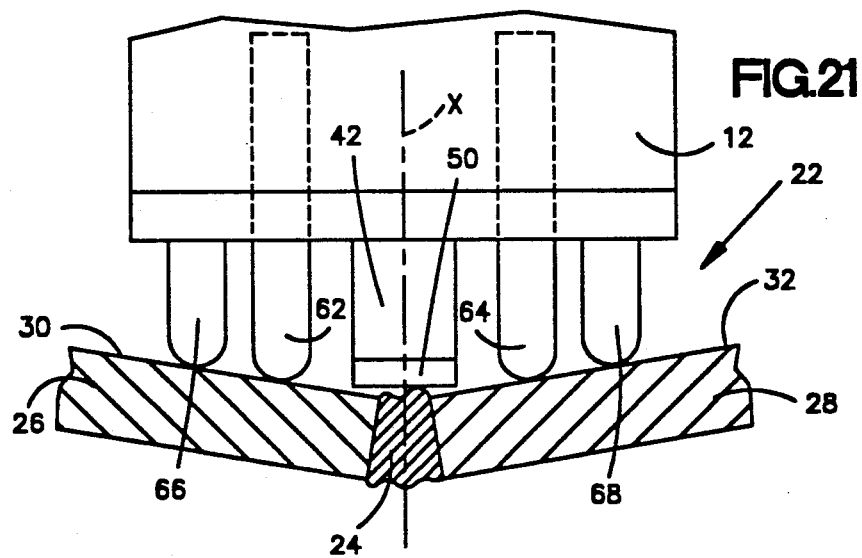
FIG. 21 is a schematic illustration of the relationship between the probe legs, alignment legs, and the joint of FIGS. 16a and 16b as the joint is being inspected.

The weld joint 22 in FIG. 21 is shown as having a negative peak angle and a zero mismatch The peak angle formed between the two major flat surfaces 30, 32 is shown exaggerated for illustrative purposes When the flat bottom surfaces 48, 50 of the alignment legs 40, 42 and the probe legs 66, 68, 62, 64 are engaged with the weld joint 22 having a negative peak angle, the two movable legs 62, 64 are retracted less into the probe assembly 12 than would be the case for a weld joint 22 having a zero peak angle.

Figure 22:
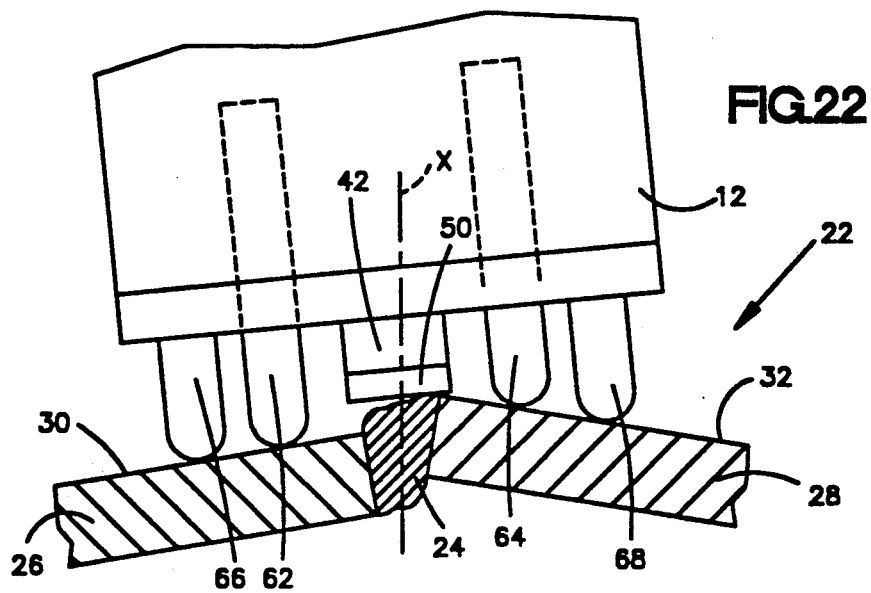
FIG. 22 is a schematic illustration of the relationship between the probe legs, alignment legs, and the joint of FIGS. 19a and 19b as the joint is being inspected.

The weld joint 22 in FIG. 22 is shown as having a positive peak angle and a negative mismatch. Again, the peak angle formed between the two major side surfaces 30, 32 is shown exaggerated for illustrative purposes When the flat bottom surfaces 48, 50 of the alignment legs 40, 42 and the probe legs 66, 68, 62, 64 are engaged with the weld joint 22 having a positive peak angle and a negative mismatch, one movable leg is retracted more into the probe assembly 12 than the other movable leg.

As shown in FIG. 22, the movable leg 64 is more retracted into the probe assembly 12 than the movable leg 62. It should be noted that the probe assembly 12 is slightly tilted with respect to the centerline of the weld joint 22. The amount of tilt shown in FIG. 22 is exaggerated for illustrative purposes. This slight tilt occurs because of the weld joint 22 having a nonzero peak angle and a nonzero mismatch. The transverse central axis 36 of the weld 24 is designated as "X".

The foregoing description of the manner in which the probe assembly 12 is used to inspect the weld joint 22 is also applicable to the manner in which the probe assembly will be used to inspect other types of joints. Thus, the alignment legs 40, 42 are used to align the probe assembly 12 with the longitudinal central axis of a joint to be inspected. The probe legs 62, 64, 66 and 68 are then pressed against surfaces on opposite sides of the joint to be inspected.

Microcomputer Operation

The microcomputer 14 calculates values of parameters associated with the geometry of a joint. More specifically, the peak angle and the mismatch of the joint are calculated. If the calculated values of the peak angles and the mismatch are within predetermined limit values stored in a memory unit of the microcomputer 14, the geometry of the joint conforms to requirements and the joint passes inspection. The strength of a weld joint and other types of joints is effected by weld geometry parameters such as the peak angle and the mismatch.

Figure 23:
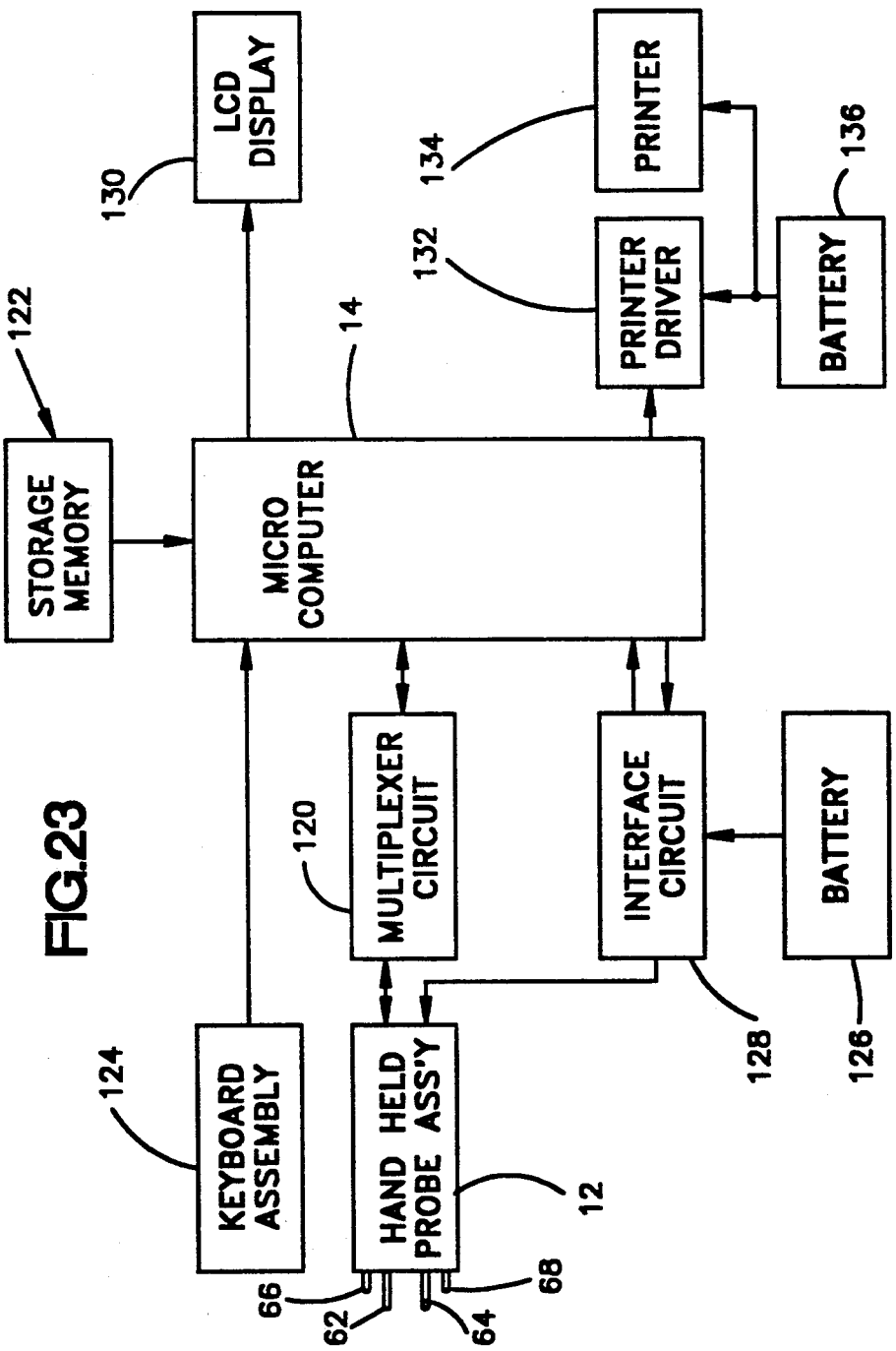
FIG. 23 is a block diagram illustrating the relationship between electronic circuitry and interfacing devices of the apparatus of FIG. 1.

Referring to FIG. 23, the relationship between the probe assembly 12 and electronic circuitry and devices associated with the microcomputer 14 is illustrated. A multiplexer circuit 120 is electrically connected between the microcomputer 14 and the probe assembly 12. The multiplexer circuit 120 is electrically connected through a standard RS232 connection to an RS232 port of the microcomputer 14. A storage memory 122 is electrically connected to the microcomputer 14. A keyboard 124 is electrically connected to an input port of the microcomputer 14. A battery pack 126 is electrically connected through an interface circuit 128 to the microcomputer 14, to the multiplexer circuit 120, and to the probe assembly 12.

An output port of the microcomputer 14 is electrically connected to a liquid crystal or other appropriate display 130. Another output port of the microcomputer 14 is electrically connected to a printer driver 132 which, in turn, is electrically connected to a printer 134. A battery pack 136 is electrically connected to the printer driver 132 and to the printer 134.

The microcomputer 14 is under the control of a computer program stored in the memory 122. The microcomputer 14 performs the various functions of the apparatus 10 in accordance with the computer program stored in the memory 122. The computer program encoded in the memory 122 may be programmed external to the apparatus 10. The memory 122 could be a read only memory if desired. The memory 122 contains the monitoring, self-testing, and calibration routines required for the microcomputer 14 to perform its intended functions. The memory 122 may also contain the registers and accumulators.

The memory 122 is a nonvolatile random access memory. The memory 122 is nonvolatile in the sense that data stored therein is not lost when main power is turned OFF. The battery 126 or other means may be used to provide the necessary power to allow the memory 122 to maintain its data when the main power is turned OFF. In the event the voltage of the battery 126 drops below a predetermined value, the microcomputer 14 responds to provide a signal indicative thereof on the display 130.

A flowchart of system operation is illustrated in FIG. 24. Upon initial application of power to the microcomputer 14 in step 200, all system parameters are initialized. After the microcomputer 14 is initialized, the operator is prompted in step 202 to zero and then verify calibration of the probe assembly 12. The probe assembly 12 is calibrated by engaging the four probe legs 66, 68, 62, 64 against surfaces having a known geometric relationship. After the probe assembly 12 is calibrated, the microcomputer 14, in step 204 generates and sends electrical signals to initialize the multiplexer circuit 120.

In step 206, the microcomputer 14 then sends an electrical signal through the interface circuit 128 to the probe assembly 12 to provide the inspector with an indication (visual or audible) of the status of the microcomputer 14. While the multiplexer circuit 120 is initializing or other calculating in step 208, the red LED 88 on the probe assembly is lit. After the multiplexer circuit 120 is initialized, the red LED indicator 88 turns OFF and the green LED indicator 90 turns ON as shown in step 210. When the green LED indicator 90 in the probe assembly 12 turns ON, the probe assembly 12 is ready to be positioned and aligned on the weld to be inspected so that a reading of data can be obtained.

After the probe assembly 12 is positioned and aligned on the weld, the inspector presses the probe assembly 12 in a direction towards the weld. The extent of movement of each of the movable probe legs 62, 64 is sensed by the signal generators 72, 74, respectively, located within the probe assembly 12. The probe assembly 12 generates an electrical signal indicative of the extent of displacement of the probe leg 62 from its zero or set position. The probe assembly 12 also generates an electrical signal indicative of the extent of displacement of the probe leg 64 from its zero or set position. To obtain a reading of the weld joint configuration as sensed by the signal generators 72, 74, the switch 92 on the probe assembly 12 is operated. In step 212, the multiplexer circuit 120 acquires these electrical signals from the probe assembly 12.

The multiplexer circuit 120 is prompted by the operation of the switch 92 to acquire the weld configuration data sensed by the signal generators 72, 74. In step 214, the multiplexer circuit 120 prompts the microcomputer that data is available and sends the sensed and acquired data to the microcomputer 14 via a standard RS232 connection to an RS232 port of the microcomputer 14. In step 216, the microcomputer 14 calculates the peak angle and the mismatch of the weld joint 22. The microcomputer 14 is designed to calculate the peak angle and the mismatch of the weld joint being inspected, and to display information related to the inspection of the weld joint on the display 130, as shown in step 218. If so desired, a hardcopy printout of this information can be obtained on the printer 134 as shown in step 220. This electronic format allows the data to also be transmitted to higher systems or devices for other uses of the collected data. As shown in step 220, the program then returns to step 204 to initialize the multiplexer circuit 120 so that the next reading of data can be taken.

Figure 25:
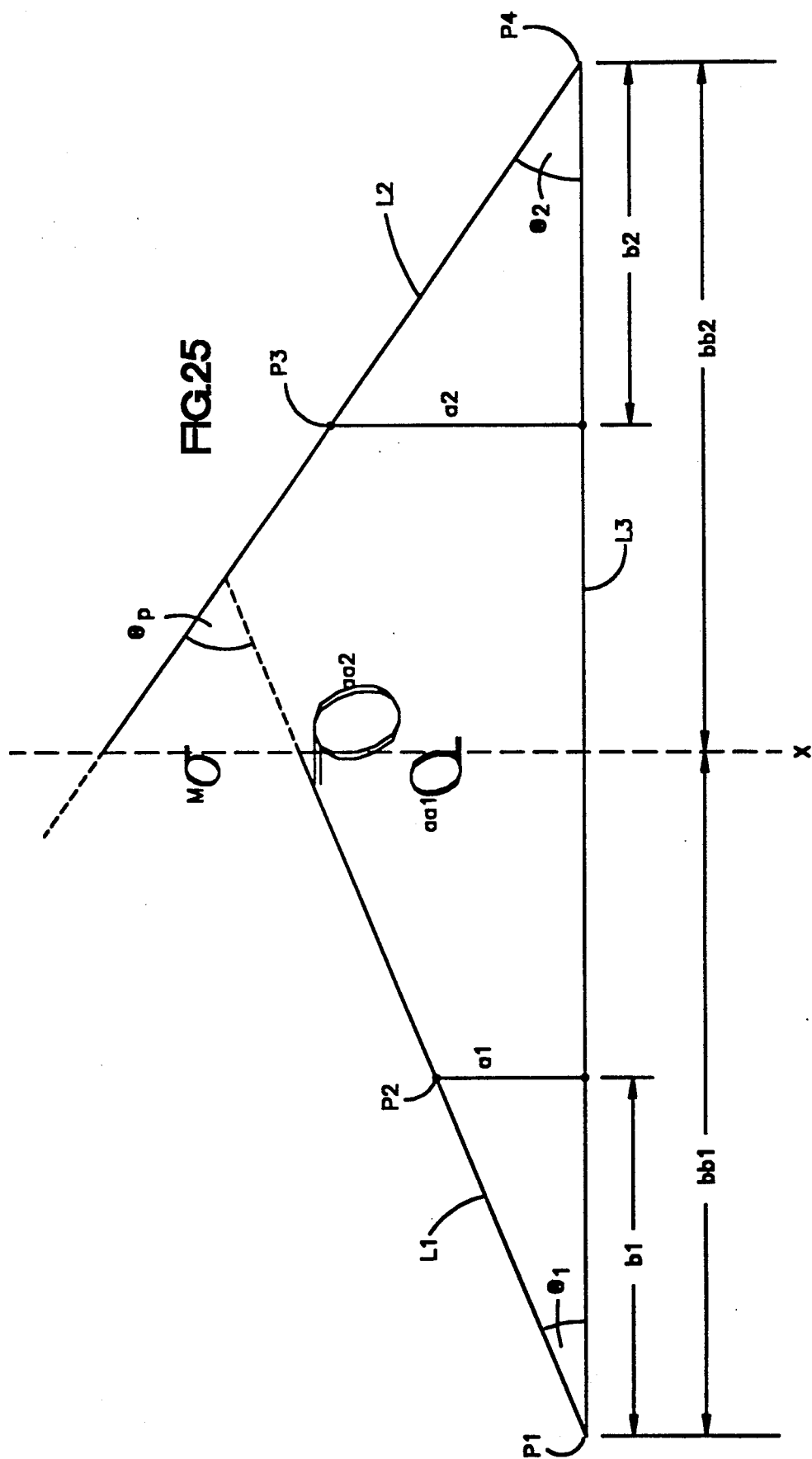
FIG. 25 is a diagram illustrating the geometric relationships which enable the magnitude of the peak angle and mismatch of the joint of FIG. 22 to be determined.

As mentioned hereinabove, the microcomputer 14 follows a computer program stored in the memory 122 to calculate the peak angle and the mismatch A better understanding of how the microcomputer 14 is able to perform these calculations is explained by referring to FIGS. 22, 25 and 26. When the four probe legs 66, 68, 62, 64 are engaged with the major side surfaces 30, 32 as shown in FIG. 22, certain geometric relationships are established between the probe legs 66, 68, 62, and 64. These geometric relationships are schematically illustrated in FIG. 25.

The fixed probe leg 66 and the movable probe leg 62 abut against the major side surface 30 of the plate edge portion 26 (FIG. 22). The major side surface 30 of the plate edge portion 26 has been indicated schematically in FIG. 25 as line "L1". The fixed probe leg 66 is placed at a point designated as "P1" and the movable probe leg 62 is placed at a point designated as "P2" on the line "L1" which corresponds to the side surface 30 of the plate edge portion 26. The fixed probe leg 68 and the movable probe leg 64 abut against the major side surface 32 of the plate edge portion 28 (FIG. 22). The major side surface 32 of the plate edge portion 28 has been indicated schematically in FIG. 25 as line "L2". The fixed probe leg 68 is placed at a point designated as "P4" and the movable probe leg 64 is placed at a point designated as "P3" on the line "L2" which corresponds to the side surface 32 of the plate edge portion 28. An imaginary line designated as "L3" interconnects points P1 and P4 and is a given in this geometric construction.

The angle formed between the line L1 and the line L3 is designated as "O1" (FIG. 25) and the angle formed between the line L2 and the line L3 is designated as "O2". The line designated "X" corresponds to the centerline of the weld and the centerline of the probe assembly 12. The shortest distance between point P2 and the line L3 is a line designated as "a1". A right angle is formed between line a1 and line L3. The length of the line a1 is equal to the distance which the movable probe leg 62 is displaced from its zero or set position. The distance between the point at which the line a1 and the line L3 intersect and the point P1 is a line designated as "b1" and is equal to the distance between the fixed probe leg 66 and the movable probe leg 62.

Similarly, the shortest distance between point P3 and the line L3 is a line designated as "a2". A right angle is formed between the line a2 and the line L3. The length of the line a2 is equal to the distance which the movable probe leg 64 is displaced from its zero or set position. The distance between the point at which the line a2 and the line L3 intersect and the point P4 is a line designated as "b2" and is equal to the distance between the fixed probe leg 68 and movable probe leg 64.

The distance between the point P1 and the line X is designated as "bb1". The distance between the point P4 and the line X is designated as "bb2". The distance bb2 is equal to the distance bb1.

A line designated as "aa1" is the distance along the line X from the point at which the line L1 intersects the line X and the point at which the line X intersects the line L3. A line designated as "aa2" is the distance along the line X from the point at which the line L2 intersects the line X and the point at which the line X intersects the line L3. If there is no mismatch, the line X will intersect the lines L1 and L2 at the same point and the distance aa1 will equal the distance aa2. If there is mismatch, as shown in FIG. 25, the line X will intersect the lines L1 and L2 at different points.

The peak angle, designated as "Op", is defined as the sum of the angle O1 and the angle O2. Applying known geometric relationships, the sum of the angle O1 and the angle O2 is the same as the angle Op formed between the line L1 and the line L2 when the lines L1, L2 are extended as shown in FIG. 21. The mismatch, designated as "M", is the distance between the point at which the line L1 intersects the line X and the point at which the line L2 intersects the line X.

The distance b1 is a fixed value corresponding to the orthogonal distance between the fixed probe leg 66 and the movable probe leg 62. Similarly, the distance b2 is a fixed value corresponding to the orthogonal distance between the fixed probe leg 68 and the movable probe leg 64. The distance bb1 is a fixed value corresponding to the orthogonal distance between the fixed probe leg 66 and the line X. The distance bb2 is a fixed value corresponding to the orthogonal distance between the fixed probe 38 and the line X. The distance bb1 is equal to the distance bb2. The values of the distance b1, b2, bb1, and bb2 are stored in the memory 122 and can be accessed by the microcomputer 14 during calculation of the peak angle and the mismatch of the weld joint 22.

When a joint is being inspected, the distance which the movable probe legs 62 and 64 are displaced from their zero or set positions are detected by the signal generators 72 and 74. Therefore, the distance a1 and the distance a2 of FIG. 25 are determined for the particular joint being inspected. The distances b1 and b2 will always be equal to the orthogonal distance between the fixed probe leg 66 and movable probe leg 62 and between the fixed probe leg 68 and the movable probe leg 64.

Based on the sensed displacement of the movable probe legs 62 and 64 and the known distances between the fixed and movable probe legs 62, 64, 66 and 68, the angle O1 between the lines L1 and L3 and the angle O2 between the lines L2 and L3 can be geometrically determined. Thus, the angle O1 is equal to the arctangent of a1 divided by b1. Similarly, the angle O2 is equal to the arctangent of a2 divided by b2. The peak angle OP is equal to the sum of the angles O1 and O2. Therefore, the peak angle of a joint can be determined by the output from the signal generators 72 and 74 during inspection of a joint.

The mismatch M for a joint being inspected is equal to the difference in length between the lines aa1 and aa2 (FIG. 25). In accordance with known trigonometric relationships, the ratio of the length of the line aa1 to the length of the line bb1 is the same as the ratio of the length of the line a1 to the length of the line b1. Therefore, the length of the line aa1 is equal to the distance bb1 times the distance a1 divided by the distance b1. Similarly, the length of the line aa2 is equal to the distance a2 times the distance bb2 divided by the distance b2.

The distances a1 and a2 are sensed by the probe assembly 12 as a result of movement of the movable probe legs 62, 64. The distances b1, b2, bb1, and bb2 remain constant for a particular probe assembly 12. Therefore, the mismatch M of a joint being inspected can be determined from the output of the signal generators 72 and 74, that is the distances a1 and a2.

A program flowchart of the steps taken by the microcomputer 14 to calculate the peak angle and the mismatch of the weld joint 22 is better illustrated in FIG. 26. Beginning at step 300, the microcomputer 14 acquires the values of a1 and a2 from the probe assembly 12 through the multiplexer circuit 120. The values of b1 and b2 are stored in the memory 122 and can be accessed by the microcomputer 14. In step 302, the microcomputer 14 calculates the value of O1 by first dividing b1 into a1. In step 304, the microcomputer 14 takes the arctangent of this quotient value. Similarly, in step 306 the microcomputer 14 calculates the value of O2 by first dividing b2 into a2. In step 308, the microcomputer 14 then takes the arctangent of this quotient value. After the values of O1 and O2 are calculated, the peak angle Op is determined by adding the value of O1 and the value of O2 together, as shown in step 310.

$$O1 = \text{arctangent} \frac{a1}{b1} \quad (1)$$

$$O2 = \text{arctangent} \frac{a2}{b2} \quad (2)$$

$$Op = \text{Peak Angle} = O1 + O2 \quad (3)$$

The values of bb1 and bb2 are also stored in the memory and can be accessed by the microcomputer 14. The microcomputer 14 calculates the value of aa1 and the value of aa2 by using known geometric relationships. After the values of aa1 and aa2 are calculated, the mismatch is determined in step 316 by subtracting the value of aa1 from aa2.

$$aa1 = \left(\frac{bb1}{b1}\right)a1 \quad (4)$$

$$aa2 = \left(\frac{bb2}{b2}\right)a2 \quad (5)$$

$$\text{Mismatch} = aa2 - aa1 \quad (6)$$

Upon completing the calculations of the peak angle and the mismatch, the microcomputer 14 outputs these calculated values to the display 130 and to the printer 134 or other devices, as shown in steps 318 and 320, respectively. The printer 134 provides a hard copy of the results of the calculations performed by the microcomputer 14. In step 322, the microcomputer 14 then provides an electrical signal through the interface circuit 128 to the green LED indicator 90 on the probe assembly 12 to indicate to the operator that the probe legs 66, 68, 62, and 64 of the probe assembly 12 are ready to be placed on the next weld joint to be inspected. In step 324, the microcomputer 14 returns to the start in step 300 to perform the next calculation. If another butt weld joint is inspected, then the above cycle of placing the probe legs 66, 68, 62, and 64 of the probe assembly 12 on the weld, calculating the peak angle and the mismatch, displaying the results, and obtaining a hard copy printout or further transmittal for use with other devices of the results is repeated.

It should be clear from the above description that the apparatus 10 relies upon dimensional measurements of a butt weld joint to determine its weld geometry. The weld geometry parameters are acquired and analyzed to determine the conformance of the weld joint to geometric requirements. The weld geometry parameters of the peak angle and the mismatch of the weld joint are precisely and accurately measured.

The apparatus 10 of the present invention can be used on a lineal or nonlineal joint having either a flat or a contoured geometry. For the purpose of describing the apparatus of the present invention, a lineal weld joint with a flat geometry was described. This description is for explanation purposes only and not to be construed as limiting the scope of the present invention. The apparatus of the present invention is also suitable for inspecting a nonlineal joint having a contoured geometry. The joint being inspected may be a weld joint or other type of joint.

The contour of the joint may be a complex contour in which the plate edge portions are curved in the direction along an arcuately curving longitudinal central axis of the joint and/or in the direction transverse to the longitudinal central axis of the joint. Precise and accurate measurements of the peak angle and the mismatch for such joints are obtainable. This occurs because of the linear array 78 of probe legs 62, 64, 66 and 68 engaging the flat edge portions 26 and 28 along a line which is perpendicular to the longitudinal central axis 34 of the joint 22. Since the probe legs 62, 64, 66 and 68 are disposed in the linear array 78 perpendicular to the longitudinal central axis 34 of the joint 22, the accuracy of the peak angle and the mismatch measurements is not effected by a joint having an arcuately curving longitudinal central axis The alignment legs 40 and 42 assist in positioning the probe assembly 12 relative to joints having arcuate central axes.

The apparatus 10 is versatile and portably packaged. The improved sensor in the probe assembly 12 has increased sensor resolution and combines with the microcomputer 14 to form a computer-based joint inspection system. Since the apparatus 10 is computer-based, repeatable and consistent measurements are obtainable during the joint inspection process. The probe assembly 12 also has improved centerline aid pointers which reduce parallax problems in positioning and aligning the probe assembly 12 with respect to the centerline of the joint to be inspected. These improved centerline aid pointers are provided by the pointer tips 54, 56 on the retractable alignment legs 40, 42. When parallax problems are eliminated, precise centerline alignment by the inspector is improved. This results in reduced inspection time and improved measurement accuracies between different inspectors. Furthermore, the subjective inputs of different inspectors during the inspection process are minimized. Significant inspection cost savings are thereby achieved.

The apparatus 10 is suitable for inspecting many different types of joints. It is believed that the apparatus 10 will be particularly useful in inspecting butt weld joints in the commercial and aerospace industries. However, the apparatus 10 can be used to inspect joints of many different types on structures which may be movable or stationary and of many different sizes. Since the inspection system is computerized, the capability is present for interfacing to a central computer for data integration and higher analysis, such as trending analysis in statistical process control applications.

In the embodiment of the invention illustrated in FIGS. 1-26, the alignment legs 40, 42 aligned with the centerline and do not hold the probe assembly against sidewise movement. In the embodiment of the invention illustrated in FIGS. 27-32, an alignment leg grips the weld bead to hold the probe assembly against sidewise movement relative to the weld bead. Since this second embodiment of the invention is generally similar to the embodiment illustrated in FIGS. 1-26, similar numerals are utilized to designate similar components, the suffix letter "a" being added to the numerals associated with the second embodiment of the invention illustrated in FIGS. 27-32 to avoid confusion.

As shown in FIGS. 27, 28 and 29, a third or central alignment leg 400 is attachable to the probe assembly 12a. The alignment leg 40a and its flat bottom surface 48a have been omitted in FIG. 29 so that the structure of the central alignment leg 400 can be more clearly shown. When attached, this central alignment leg 400 is disposed midway between the retractable alignment legs 40a, 42a. This central alignment leg 400 is disposed in a central portion of the linear array of probe legs 62a, 64a, 66a and 68a. One end of the third alignment leg 400 is attachable to the probe assembly 12a. A spring chamber 402 with a compression spring 404 contained therein urges the third alignment leg 400 in a direction away from the probe assembly 12a. The spring 402 chamber is contained within the housing 44a. The third alignment leg 400 is pictorially illustrated in FIG. 30. The third alignment leg 400 has an end portion 406 connected to a stem portion 408.

Referring to FIGS. 30, 31 and 32, the end portion 406 is illustrated in detail. The end portion 406 has two major arcuate surfaces 410, 412 for engaging opposite longitudinally extending sides of a weld bead in a weld joint to be inspected. The major arcuate surfaces 410, 412 intersect to form a predetermined angle between the two major arcuate surfaces 410, 412. Each of the major arcuate surfaces 410, 412 extends in a direction away from the intersection of the two major arcuate surfaces 410, 412. Each of the major arcuate surfaces 410, 412 has an arcuate edge portion 414, 416, respectively. These arcuate edge portions 414, 416 of the two major arcuate surfaces 410, 412 allow the end portion 400 to be easily positioned and aligned on the weld bead of the butt weld joint being inspected.

Although this third alignment leg 400 is advantageously used when it is desired to inspect a nonlineal butt weld joint, it can also be used to inspect a lineal butt weld joint. It is contemplated that the bottom of one or both flat bottom surfaces 48a, 50a of the alignment legs 40a, 42a can be constructed in the same manner as that of the third alignment leg 400. Thus, each of the flat bottom surfaces 48a, 50a of the alignment legs 40a, 42a would have the gripping action as provided by major arcuate surfaces similar to the major arcuate surfaces 410, 412. It is further contemplated that only the third alignment leg 400 be used alone, i.e., without the alignment legs 40a, 42a.

In the embodiment of the invention illustrated in FIGS. 27-32, the third alignment leg 400 has a construction which enables it to cooperate with a weld bead. When the probe assembly 12a is to be used to inspect other types of joints, the third alignment leg will have a different construction to enable it to cooperate with the particular type of joint to be inspected. For example, a plunger could be used to engage a joint between body panels or doors on an automobile prior to interconnecting them.

This invention has been described above with reference to preferred embodiments. Modifications and alterations may become apparent to one skilled in the art upon reading and understanding the specification. It is intended to include all such modifications and alterations within the scope of the appended claims.

Having described specific preferred embodiments of the invention, the following is claimed:

1. An apparatus for use in determining a relationship between first and second plate edge portions having surfaces extending in opposite directions from a joint, said apparatus comprising:

a first probe leg having first surface means for engaging the surface of the first plate edge portion;

a second probe leg movable relative to said first probe leg and having second surface means for engaging the surface of the first plate edge portion;

signal generator means, said signal generator means including means for generating a first signal which varies as a function of an extent of movement between said first and second probe legs;

a third probe leg having third surface means for engaging the surface of the second plate edge portion; and a fourth probe leg movable relative to said third probe leg and having fourth surface means for engaging the surface of the second plate edge portion, said signal generator means including means for generating a second signal which varies as a function of an extent of movement between said third and fourth probe legs.

2. The apparatus of claim 1 further including means connected with said signal generator means for providing an output which is a function of a spatial relationship between the surface of the first plate edge portion and the surface of the second plate edge portion 3. The apparatus of claim 1 wherein the first plate edge portion is in a first plane, the second plate edge portion is in a second plane, and a spatial relationship between the first and second plate edge portions defines a peak angle which is a function of an angle formed between the first and second planes, and further including means connected with said signal generator means for providing an output which is a function of the peak angle.

4. The apparatus of claim 1 wherein the joint has a transverse centerline extending transversely to the surfaces of the first and second plate edge portions, the first plate edge portion is in a first plane, the second plate edge portion is in a second plane, and further including means connected with said signal generator means for providing an output which is a function of a distance between an intersection of the transverse centerline of the joint with the first plane and an intersection of the transverse centerline of the joint with the second plane.

5. The apparatus of claim 1 wherein the joint has a transverse centerline extending transversely to the surfaces of the first and second plate edge portions, the first plate edge portion is in a first plane, the second plate edge portion is in a second plane, and a spatial relationship between the first and second plate edge portions defines a peak angle which is a function of an angle formed between the first and second planes, and further including means connected with said signal generator means for providing an output which is a function of the peak angle and for providing an output which is a function of a distance between an intersection of the centerline of the joint with the first plane and an intersection of the centerline of the joint with the second plane.

6. The apparatus of claim 1 wherein said means for generating said first signal includes means for varying said first signal when said second surface means of said second probe leg is in engagement with the surface of the first plate edge portion and said first and second probe legs are moving relative to each other.

7. The apparatus of claim 6 wherein said means for generating said second signal includes means for varying said second signal when said fourth surface means of said fourth probe leg is in engagement with the surface of the second plate edge portion and said third and fourth probe legs are moving relative to each other.

8. The apparatus of claim 1 wherein said first, second, third, and fourth probe legs are spaced apart and are in a linear array.

9. The apparatus of claim 8 further including first and second retractable alignment legs disposed on opposite sides of said linear array of probe legs, said first alignment leg having fifth surface means for engaging the joint and being retractable from an initial position to a retracted position upon engagement of said fifth surface means with the joint, said second alignment leg having sixth surface means for engaging the joint and being retractable from an initial position to a retracted position upon engagement of said sixth surface means with the joint.

10. The apparatus of claim 9 further including a third retractable alignment leg having seventh surface means for engaging the joint and being retractable from an initial position to a retracted position upon engagement of said seventh surface means with the joint.

11. The apparatus of claim 10 wherein said third alignment leg is in the linear array of probe legs.

12. An apparatus for use in inspecting a longitudinally extending joint between first and second plate edge portions having surfaces extending in opposite directions from the joint, said apparatus comprising:
a base;
first surface means connected with said base for engaging the first plate edge portion adjacent to a first side of the joint;
second surface means connected with said base for engaging the second plate edge portion adjacent to a second side of the joint, said first and second surface means being movable to a relationship which is a function of the spatial relationship between the first and second plate edge portions; and
positioning means connected with said base for engaging the joint to locate said first and second surface means relative to the joint in a direction transverse to a longitudinal axis of the joint.

13. The apparatus as set forth in claim 12 wherein said positioning means includes a first alignment leg having surface means for engaging a first portion of the joint and a second alignment leg having surface means for engaging a second portion of the joint, said first alignment leg and first portion of the joint being spaced from said second alignment leg and second portion of the joint along the longitudinal axis of the joint.

14. The apparatus as set forth in claim 12 wherein said positioning means includes alignment means for engaging a portion of the joint at a location between said first and second surface means.

15. The apparatus as set forth in claim 12 wherein said positioning means includes surface means for engaging a first longitudinally extending side portion of the joint and for engaging a second longitudinally extending side portion of the joint to retard movement of said first and second surface means in a direction transverse to the longitudinal axis of the joint.

16. The apparatus as set forth in claim 12 further including signal generator means connected with said first and second surface means and said base for generating a signal which is a function of the spatial relationship between the first and second plate edge portions.

17. The apparatus as set forth in claim 12 further including a first plurality of probe legs connected with said base and a second plurality of probe legs connected with said base and spaced from said first plurality of probe legs, said first surface means being on said first plurality of probe legs, said second surface means being on said second plurality of probe legs.

18. The apparatus as set forth in claim 17 wherein at least one probe leg of said first plurality of probe legs is movable relative to another probe leg of said first plurality of probe legs upon engagement of said first and second surface means with said first and second plate edge portions, and further including signal generator means connected with said base and at least one probe leg of said first and second plurality of probe legs for generating a signal which varies as a function of an extent of movement between said first and second plurality of probe legs.

19. An apparatus as set forth in claim 12 wherein said positioning means includes an alignment leg which is movable relative to said base between an extended condition and a retracted condition and biasing means for urging said alignment leg toward the extended condition, said alignment leg being movable from the extended condition to the retracted condition under the influence of force applied against said alignment leg.

20. An apparatus as set forth in claim 12 wherein said positioning means includes a first member for engaging the joint at a location adjacent to a first side of said base and a second member for engaging the joint at a location adjacent to a second side of said base which is opposite from the first side of said base.

21. An apparatus as set forth in claim 12 wherein said positioning means includes means for engaging the joint to retard movement of said base relative to the joint in a direction transverse to the longitudinal axis of the joint.

22. An apparatus for use in inspecting a joint between first and second plate edge portions having surfaces extending in opposite direction from the joint, said apparatus comprising:
a base;
first surface means fixedly connected with said base for engaging the surface of the first plate edge portion;
second surface means fixedly connected with said base for engaging the surface of the second plate edge portion;
third surface means connected with and movable relative to said base and first surface means for engaging the surface of the first plate edge portion;
fourth surface means connected with and movable relative to said base and second surface means for engaging the surface of the second plate edge portion; and
means connected with said base and said third and fourth surface means for providing an output which is a function of the positions of said third and fourth surface means relative to said base.

23. The apparatus as set forth in claim 22 further including fifth surface means connected with and movable relative to said base for engaging the joint to further determine the spatial relationship between said base and the first and second plate portions.

24. The apparatus as set forth in claim 23 wherein said fifth surface means includes a first surface area connected with a first side of said base and engageable with the joint at a first location along the joint and a second surface area connected with a second side of said base and engageable with the joint at a second location along the joint, said first, second, third and fourth surface means being connected with said base at a location between said first and second sides of said base.

25. The apparatus as set forth in claim 23 wherein said fifth surface means is engageable with opposite sides of the joint to hold the base against sidewise movement relative to the joint.

26. The apparatus as set forth in claim 22 further including a first probe leg fixedly connected with and extending outwardly from one end of said base, said first surface means being on an outer end portion of said first probe leg, a second probe leg fixedly connected with and extending outwardly from the one end of said base, said second surface means being on an outer end portion of said second probe leg, an third probe leg movably connected with and extending outwardly from the one end of said base, said third surface means being on an outer end portion of said third probe leg, and a fourth probe leg movably connected with and extending outwardly from the one end of said base, said fourth surface means being on an outer end portion of said fourth probe leg.

27. The apparatus as set forth in claim 26 wherein said base has a central axis which extends through the one end of said base, said first and third probe legs being on a first side of a plane containing the central axis of the base and said second and fourth probe legs being on a second side of the plane containing the central axis of the base.

28. The apparatus as set forth in claim 27 further including fifth surface means connected with said base for use in positioning the base relative to the joint with the central axis of the base extending through the joint.

29. The apparatus as set forth in claim 26 wherein said first, second, third and fourth probe legs are in a linear array with said first and second probe legs at opposite ends of the linear array.

30. The apparatus as set forth in claim 28 further including an alignment leg in a central portion of the linear array of probe legs, said alignment leg having surface means for engaging the joint to further determine the spatial relationship between said base and said first and second plate edge portions.

31. The apparatus as set forth in claim 22 wherein said means for providing an output which is a function of the positions of said third and fourth surface means relative to said base includes first signal generator means connected with said third surface means for providing an output which is a function of an extent of movement of said third surface means relative to said bas and second signal generator means connected with said fourth surface means for providing an output which is a function of an extent of movement of said fourth surface means relative to said base.

32. An apparatus for use in inspecting a joint between first and second plate edge portions having surfaces extending in opposite directions from the joint, said apparatus comprising:
a base;
a plurality of probe legs connected with said base and having surface means for engaging the surface of said first and second plate edge portions, at least one of said plurality of probe legs being retractable from an initial position to a retracted position;
alignment means connected with said base and having surface means for engaging opposite sides of the joint to position said plurality of probe legs relative to the joint;
signal generator means connected with said one of said plurality of probe legs for generating a signal which varies as a function of an extent of retraction of said one of said plurality of probe legs from its initial position.

33. The apparatus of claim 32 wherein said plurality of probe legs is in a linear array.

34. The apparatus of claim 33 wherein sail alignment means is located in the linear array of said plurality of probe legs, said alignment means being retractable from an initial position to a retracted position upon engagement of said surface means of said alignment means with the joint.

35. A method for use in inspecting a longitudinally extending joint between first and second plate edge portions having surfaces extending in opposite directions from the joint, said method comprising the steps of:

engaging the first plate edge portion with a first probe leg;

engaging the first plate edge portion with a second probe leg;

moving the second probe leg relative to the first probe leg after engaging the first plate edge portion with the second probe leg;

generating a first signal which varies as a function of the extent of movement between said first and second probe legs;

engaging the second plate edge portion with a third probe leg;

engaging the second plate edge portion with a fourth probe leg;

moving the fourth probe leg relative to the third probe leg after engaging the second plate edge portion with the fourth probe leg; and generating a second signal which varies as a function of the extent of movement between said third and fourth probe legs.

36. The method of claim 35 further including the step of positioning the first, second, third, and fourth probe legs relative to the joint, said step of positioning the first, second, third and fourth probe legs relative to the joint including engaging the joint with a first alignment leg.

37. The method of claim 36 wherein said step of positioning the first, second, third, and fourth probe legs relative to the joint includes engaging the joint with a second alignment leg.

38. The method of claim 36 wherein said step of positioning the first, second, third and fourth probe legs relative to the joint includes engaging opposite longitudinally extending side portions of the joint with the first alignment leg.

39. The method of claim 36 further including the step of moving the first, second, third and fourth probe legs along the joint while maintaining said first alignment leg in engagement with the joint.

* * * * *

UNITED STATES PATENT AND TRADEMARK OFFICE
CERTIFICATE OF CORRECTION

PATENT NO. : 5,097,423

DATED : March 17, 1992

INVENTOR(S) : Michael A. Badinger

It is certified that error appears in the above-identified patent and that said Letters Patent is hereby corrected as shown below:

Column 21, Line 48, Claim 23, after "plate" insert --edge--.

Column 22, Line 37, Claim 31, change "bas" to --base--.

Signed and Sealed this

Eighth Day of June, 1993

Attest:

MICHAEL K. KIRK

Attesting Officer

Acting Commissioner of Patents and Trademarks